(12) United States Patent
Yasaki

(10) Patent No.: US 11,455,129 B2
(45) Date of Patent: Sep. 27, 2022

(54) IMAGE PROCESSING APPARATUS, METHOD OF CONTROLLING THE SAME, VERIFICATION APPARATUS, METHOD OF CONTROLLING THE SAME, AND STORAGE MEDIUM THAT DISPLAY A DEFECTIVE IMAGE IN WHICH A DEFECTIVE AREA IS EMPHASIZED AND IS NOT EMPHASIZED

(71) Applicant: CANON KABUSHIKI KAISHA, Tokyo (JP)

(72) Inventor: Kosuke Yasaki, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/009,956

(22) Filed: Sep. 2, 2020

(65) Prior Publication Data

US 2021/0072933 A1   Mar. 11, 2021

(30) Foreign Application Priority Data

Sep. 5, 2019  (JP) .............................. JP2019-162361

(51) Int. Cl.
| | |
|---|---|
| *G06F 11/08* | (2006.01) |
| *G06F 3/12* | (2006.01) |
| *G06T 7/00* | (2017.01) |

(52) U.S. Cl.
CPC .......... *G06F 3/1208* (2013.01); *G06F 3/1256* (2013.01); *G06T 7/0004* (2013.01); *G06T 2207/10008* (2013.01); *G06T 2207/30144* (2013.01)

(58) Field of Classification Search
CPC .. G06F 7/02; G06F 2207/7271; G06F 3/1256; G06T 7/0002; G06T 2207/30144

USPC ...................... 358/1.18, 1.14, 3.26, 504, 518
See application file for complete search history.

(56) References Cited

U.S. PATENT DOCUMENTS

| | | | |
|---|---|---|---|
| 5,764,793 A * | 6/1998 | Omae ..................... | G06T 7/001 382/294 |
| 2002/0168099 A1* | 11/2002 | Noy ....................... | G06T 7/0002 382/149 |
| 2006/0008155 A1* | 1/2006 | Ishikawa ................ | H04N 1/409 382/232 |
| 2011/0069357 A1* | 3/2011 | Austin ................ | H04N 1/00355 358/474 |
| 2011/0235925 A1* | 9/2011 | Itoh ..................... | G08B 13/1961 382/218 |

(Continued)

FOREIGN PATENT DOCUMENTS

JP          2010-173289 A          8/2010

*Primary Examiner* — Jamares Q Washington
(74) *Attorney, Agent, or Firm* — Venable LLP

(57) ABSTRACT

An image processing apparatus includes a printer that prints an image on a sheet, a scanner that reads an image on a sheet, and one or more controllers configured to cause the scanner to read an image on a sheet, to cause a display to display the image, to receive an instruction for adopting an image serving as a candidate for a correct image from the displayed image, to generate the correct image based on the image serving as the candidate, to register the correct image, and to cause the scanner to read an image printed on a sheet and to verify the printed image based on the read image and the registered correct image. When a defective image is in the read image, the display displays the defective image in which a defective area is emphasized and the defective image in which the defective area is not emphasized.

21 Claims, 16 Drawing Sheets

(56) References Cited

U.S. PATENT DOCUMENTS

| | | | |
|---|---|---|---|
| 2013/0016917 A1* | 1/2013 | Rodriguez | H04N 19/503 |
| | | | 382/232 |
| 2014/0285852 A1* | 9/2014 | Aikawa | H04N 1/32112 |
| | | | 358/3.24 |
| 2018/0131815 A1* | 5/2018 | Spivakovsky | G06V 10/751 |

* cited by examiner

FIG. 14A

CORRECT IMAGE DATA HAS BEEN REGISTERED ~701

INVOICE

| XXXXXXX | XXXXXXX | XXXXXXX |
|---|---|---|
| XXXXXXX | XXXXXXX | XXXXXXX |
| XXXXXXX | XXXXXXX | XXXXXXX |
| XXXXXXX | XXXXXXX | XXXXXXX |
| XXXXXXX | XXXXXXX | XXXXXXX |
| XXXXXXX | XXXXXXX | XXXXXXX |
| XXXXXXX | XXXXXXX | XXXXXXX |
| XXXXXXX | XXXXXXX | XXXXXXX |
| XXXXXXX | XXXXXXX | XXXXXXX |
| XXXXXXX | XXXXXXX | XXXXXXX |
| XXXXXXX | XXXXXXX | XXXXXXX |
| XXXXXXX | XXXXXXX | XXXXXXX |
| XXXXXXX | XXXXXXX | XXXXXXX |

~702

- CLEAR CORRECT IMAGE DATA ~1401
- CORRECT IMAGE DATA ADDITIONAL REGISTRATION ~1402
- VERIFICATION SETTING ~706
- START VERIFICATION ~707

FIG. 14B

ADDITIONAL REGISTRATION OF CORRECT IMAGE DATA

NUMBER OF SHEETS TO BE ADDED

ONE SHEET △▽ ~1410

- ADD INDIVIDUAL SHEET ~1411
- ADD ALL SHEETS AT ONCE ~1412

ADDITIONAL NUMBER OF IMAGES

ONE SHEET △▽ ~1413

- START ~1414

FIG. 15

VERIFICATION SETTINGS

VERIFICATION LEVEL

LEVEL 3 △▽ ~1501

THE HIGHER THE VERIFICATION LEVEL EVEN SLIGHT DIFFERENCE DETERMINE TO BE DEFECTIVE IMAGE

VERIFICATION TYPE 1502

| | |
|---|---|
| ☑ | POSITION |
| ☑ | TINT |
| | DENSITY |
| ☑ | STREAK |
| ☑ | DROPOUT |

1503~ OK    CANCEL ~1504

FIG. 16

VERIFICATION IN PROGRESS ...

INVOICE ~1601

| XXXXXXX | XXXXXXX | XXXXXXX |
|---|---|---|
| XXXXXXX | XXXXXXX | XXXXXXX |
| XXXXXXX | XXXXXXX | XXXXXXX |
| XXXXXXX | XXXXXXX | XXXXXXX |
| XXXXXXX | XXXXXXX | XXXXXXX |
| XXXXXXX | XXXXXXX | XXXXXXX |
| XXXXXXX | XXXXXXX | XXXXXXX |
| XXXXXXX | XXXXXXX | XXXXXXX |
| XXXXXXX | XXXXXXX | XXXXXXX |
| XXXXXXX | XXXXXXX | XXXXXXX |
| XXXXXXX | XXXXXXX | XXXXXXX |
| XXXXXXX | XXXXXXX | XXXXXXX |
| XXXXXXX | XXXXXXX | XXXXXXX |

READ IMAGE

89th COPY 1 NUMBER OF SHEETS

DETERMINATION RESULT: OK ~1602

END VERIFICATION ~1603

IMAGE PROCESSING APPARATUS, METHOD OF CONTROLLING THE SAME, VERIFICATION APPARATUS, METHOD OF CONTROLLING THE SAME, AND STORAGE MEDIUM THAT DISPLAY A DEFECTIVE IMAGE IN WHICH A DEFECTIVE AREA IS EMPHASIZED AND IS NOT EMPHASIZED

This application claims the benefit of Japanese Patent Application No. 2019-162361 filed Sep. 5, 2019, which is hereby incorporated by reference herein in its entirety.

BACKGROUND OF THE INVENTION

Field of the Invention

The present invention relates to an image processing apparatus and a method of controlling the same, a verification apparatus and a method of controlling the same, and a storage medium.

Description of the Related Art

Recently, printing systems are known in which the quality of a sheet printed by a printing apparatus can be determined by using a verification apparatus to inspect the printed sheet while the sheet is being conveyed. In the printed sheet inspection, the verification apparatus reads an image of the conveyed sheet and, on the basis of image analysis carried out on the read image, determines whether or not the printed image is normal. The verification apparatus can detect, for example, a lack of a barcode or a ruled line, image drops, printing defects, missing pages, color shifts, and so on of the printed sheets. When it is determined that there is such a defective sheet, the defective sheet is discharged to a discharge destination different from a discharge destination of normal sheets. This prevents defective sheets and normal sheets from being intermixed, and makes it possible to discard defective sheets with ease.

As a method for creating a correct image (a master image; a reference image) using image analysis performed in such an inspection, a method is known in which a printed sheet with a sufficient level of quality, printed in image data is then used as the correct image. Obtaining such a correct image using the reading sensor that will be used in the actual inspection process by the verification apparatus makes it possible to suppress erroneous determinations in inspections arising due to the sheet conveyance precision, the accuracy of reading by the sensor, and so on.

However, when obtaining the correct image, the sheet to be read not only must be printed at a quality sufficient for use as a correct image, but also must be read correctly by the reading sensor. For example, it is conceivable that paper powder from the sheet will stick to the reading sensor of the verification apparatus, resulting in the image data that has been read containing data that is streaky and, therefore, incorrect. If image data that contains such data is then used as a correct image, an image on a printed sheet that has a sufficient level of quality, for example, may nevertheless be erroneously determined to be a sheet having a printing defect.

Japanese Patent Laid-Open No. 2010-173289 discloses a technique in which whether or not an image defect has occurred is confirmed before and after data of a correct image ("correct image data" hereafter) is obtained, in order to determine whether printing or reading defects have occurred when obtaining the correct image data. However, even if a problem with the image data caused by paper powder as described earlier has not occurred before and after the correct image data is obtained, it is certainly conceivable that such a problem can occur right at the time when the correct image data is obtained. As such, there is a problem in that whether or not an image defect has occurred when the correct image data is obtained cannot be determined with certainty.

Furthermore, with a method that mechanically detects and excludes image defects such as streakiness, if the normal images include an image that already has streaks, a determination that an image defect has occurred may be made erroneously even when the image in question is normal. Furthermore, if a correct image that contains an image that is already streaky is used, even normal printed materials may be erroneously detected as containing printing defects.

SUMMARY OF THE INVENTION

An aspect of the present invention is to eliminate the above-mentioned problem with conventional technology.

A feature of the present invention is to provide a technique which makes it possible to generate correct image data while reliably excluding, from candidate images used to generate the correct image data, image data in which the image read when obtaining the correct image data contained an image defect.

According to a first aspect, the present invention provides an image processing apparatus comprising at least one processor and at least one memory are configured to function as an obtaining unit that obtains read image data by causing a reader to read a sheet onto which an image serving as a candidate for correct image data is printed, a display unit that displays, on a display, a preview of the read image data along with a screen for enabling image data that is to serve as a candidate for the correct image data to be selected from the read image data, and a generating unit that generates the correct image data on the basis of the image data selected in the screen.

According to a second aspect, the present invention provides a verification apparatus that verifies a printed sheet, the apparatus comprising at least one processor and at least one memory configured to function as a first obtaining unit that obtains read image data by causing a reader to read a sheet onto which an image serving as a candidate for correct image data is printed a display unit that displays, on a display, a preview of the read image data along with a screen for enabling image data that is to serve as a candidate for the correct image data to be selected from the read image data, a storage unit that stores correct image data generated by an image processing apparatus including a generating unit that generates the correct image data on the basis of the image data selected in the screen, a second obtaining unit that reads and obtains a sheet to be verified, and a determining unit that determines a quality of the sheet to be verified on the basis of the correct image data stored in the storage unit and image data of the sheet to be verified that has been obtained by the second obtaining unit.

According to a third aspect, the present invention provides a verification apparatus comprising a reader, a display, and at least one processor and at least one memory configured to function as a first obtaining unit that obtains read image data by causing the reader to read a sheet; a display unit that displays, on the display, a preview of the read image data along with a screen for enabling image data that is to serve as a candidate for the correct image data to be selected from the read image data, a generating unit that generates the correct image data from the image data selected in the screen, a storage unit that stores the correct image data generated by the generating unit, a second obtaining unit that obtains image data of a sheet to be verified by causing the reader to read the sheet to be verified, and a determining unit that determines a quality of the sheet to be verified on the basis of the correct image data stored in the storage unit and image data of the sheet to be verified that has been obtained by the second obtaining unit.

According to a fourth aspect, the present invention provides a method of controlling an image processing apparatus, the method comprising obtaining read image data by causing a reader to read a sheet onto which an image serving as a candidate for correct image data is printed, displaying, on a display, a preview of the read image data along with a screen for enabling image data that is to serve as a candidate for the correct image data to be selected from the read image data, and generating the correct image data from the image data selected in the screen.

According to a fifth aspect, the present invention provides a method of controlling a verification apparatus, the method comprising: obtaining read image data by having a reader read a sheet, displaying, on a display, a preview of the read image data along with a screen for enabling image data that is to serve as a candidate for correct image data to be selected from the read image data, generating the correct image data from the image data selected in the screen, storing the correct image data generated in the generating in a memory, obtaining image data of a sheet to be verified by causing the reader to read the sheet to be verified, and determining a quality of the sheet to be verified on the basis of the correct image data stored in the memory and image data of the sheet to be verified that has been obtained.

According to a sixth aspect, the present invention provide a non-transitory computer-readable storage medium storing a program for causing a computer to execute a method of controlling an image processing apparatus, the method comprising obtaining read image data by causing a reader to read a sheet onto which an image serving as a candidate for correct image data is printed, displaying, on a display, a preview of the read image data along with a screen for enabling image data that is to serve as a candidate for the correct image data to be selected from the read image data, and generating the correct image data from the image data selected in the screen.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 14A depicts a view illustrating an example of a screen displayed when correct image data is registered in the verification apparatus.

FIG. 14B depicts a view illustrating an example of a setting screen when additionally registering correct image data.

FIG. 15 depicts a view illustrating an example of a setting screen displayed in the display unit when verification settings are made in the verification apparatus, according to the embodiment.

FIG. 16 depicts a view illustrating an example of a screen displayed in the display unit of the verification apparatus in step S606.

DESCRIPTION OF THE EMBODIMENTS

An embodiment of the present invention will be described hereafter in detail, with reference to the accompanying drawings. It is to be understood that the following embodiment is not intended to limit the claims of the present invention, and that not all of the combinations of the aspects that are described according to the following embodiments are necessarily required with respect to the means to solve the problems according to the present invention. Multiple features may be combined as desired. Furthermore, in the accompanying drawings, the same or similar configurations are given the same reference signs, and redundant descriptions thereof will be omitted. Note that in the following descriptions, an external controller 102 may be referred to as an image processing controller, a digital front-end, a print server, a DFE, or the like, as well. Likewise, an image forming apparatus 101, which is an example of an image processing apparatus according to the present invention, may be referred to as a multifunction peripheral (MFP) as well.

Figure 1:
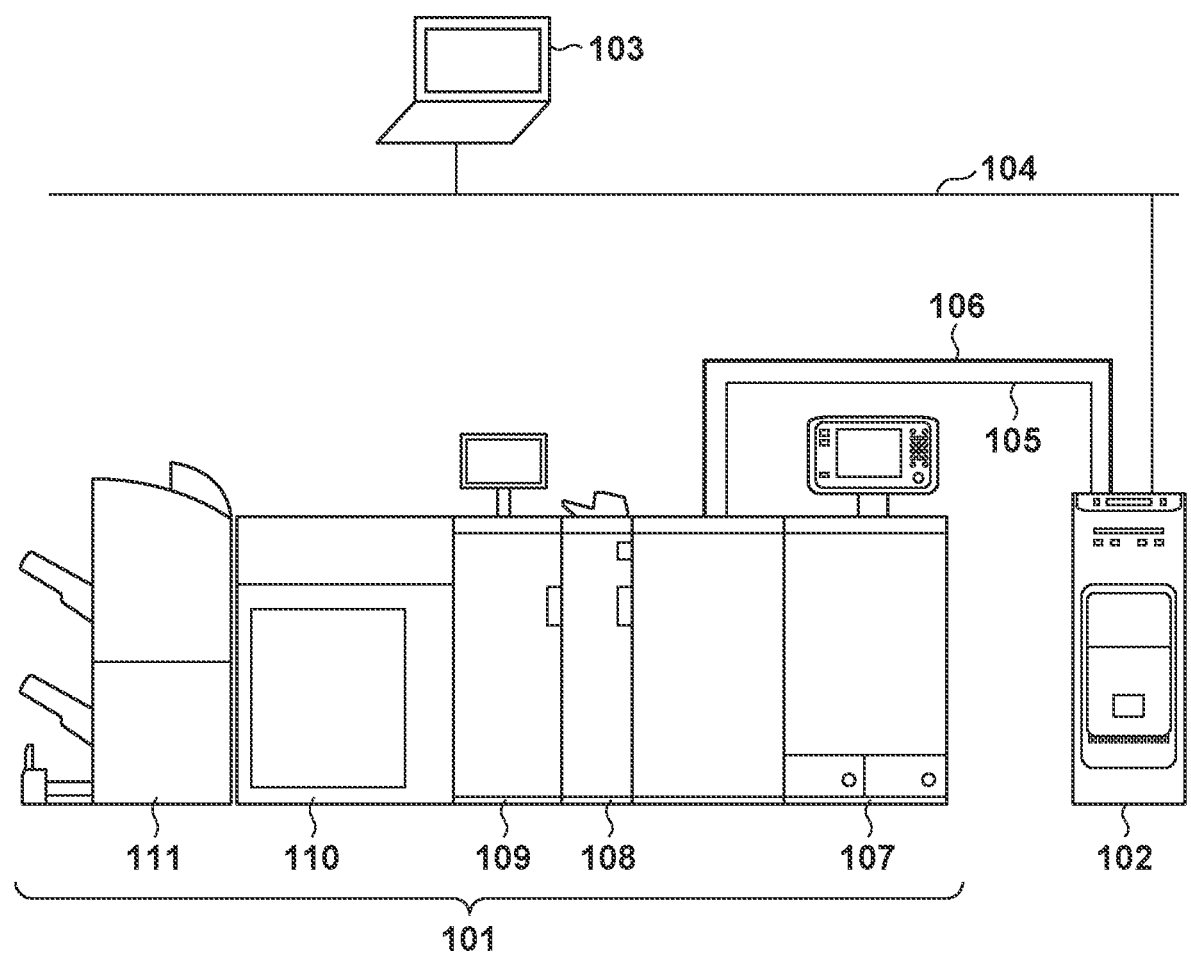
FIG. 1 is a diagram for describing the configuration of an image processing system according to an embodiment of the present invention.

FIG. 1 is a diagram for describing the configuration of an image processing system according to the embodiment of the present invention.

This image processing system includes the image forming apparatus 101 and the external controller 102. The image forming apparatus 101 and the external controller 102 are communicably connected via an internal LAN 105 and a video cable 106. The external controller 102 is communicably connected to a client PC (personal computer) 103 (called simply a "PC 103" hereafter) via an external LAN 104, and printing instructions are issued to the external controller 102 from the PC 103.

A printer driver, which has a function for converting print data into page description language that can be processed by the external controller 102, is installed in the PC 103. A user who wishes to print can issue a printing instruction through the printer driver from various types of applications. The printer driver sends print data to the external controller 102 on the basis of the printing instruction from the user. Upon receiving the printing instruction from the PC 103, the external controller 102 performs data analysis and rasterizing processing, and issues a printing instruction including the print data to the image forming apparatus 101.

The image forming apparatus 101 will be described next. A plurality of devices, each having a different function, are connected to the image forming apparatus 101, are configured so that complex processing such as book binding can be performed.

A printing apparatus 107 uses toner to form (print) an image onto paper (a sheet) conveyed from a paper feeder located in a lower part of the printing apparatus 107. The configuration and principles of operation of the printing apparatus 107 are as follows. Light rays, such as from a laser beam, which have been modulated in accordance with image data, are reflected by a rotating polygonal mirror, and a photosensitive drum is irradiated with the resulting scanning light. An electrostatic latent image formed on the photosensitive drum by this laser beam is developed using toner, and the resulting toner image is transferred onto a sheet which adheres to a transfer drum. A full-color image is formed on the sheet by executing this sequence of image forming processes in order for yellow (Y), magenta (M), cyan (C), and black (K) toners. The sheet on the transfer drum, on which a full-color image has been formed in this manner, is conveyed to a fixing unit. The fixing unit includes rollers, belts, and the like, with heat sources such as halogen heaters built into the rollers. The toner on the sheet onto which the toner image has been transferred is melted and fixed to the sheet using heat and pressure.

An inserter 108 inserts an insertion sheet between sheets that are conveyed. In other words, a sheet can be inserted at a desired position in a group of sheets that have been printed onto by the printing apparatus 107 and conveyed. A verification apparatus 109 determines whether or not an image printed onto a conveyed sheet is normal by reading an image of the sheet and comparing that image with pre-registered correct image data. A large-capacity stacker 110 can stack a large volume of sheets. A finisher 111 performs finishing processing on conveyed sheets. This finishing processing includes stapling, punching, saddle-stitch book binding, and the like, and the product obtained from the finishing processing is discharged to a discharge tray.

Although the printing system illustrated in FIG. 1 has a configuration in which the external controller 102 is connected to the image forming apparatus 101, the present invention is not limited to a configuration in which the external controller 102 is connected. In other words, the configuration may be such that the image forming apparatus 101 is directly connected to the external LAN 104 and the PC 103 sends the print data to the image forming apparatus 101 over the external LAN 104. In this case, printing processing is executed with the data analysis, rasterizing processing, and so on performed in the image forming apparatus 101.

Figure 2:
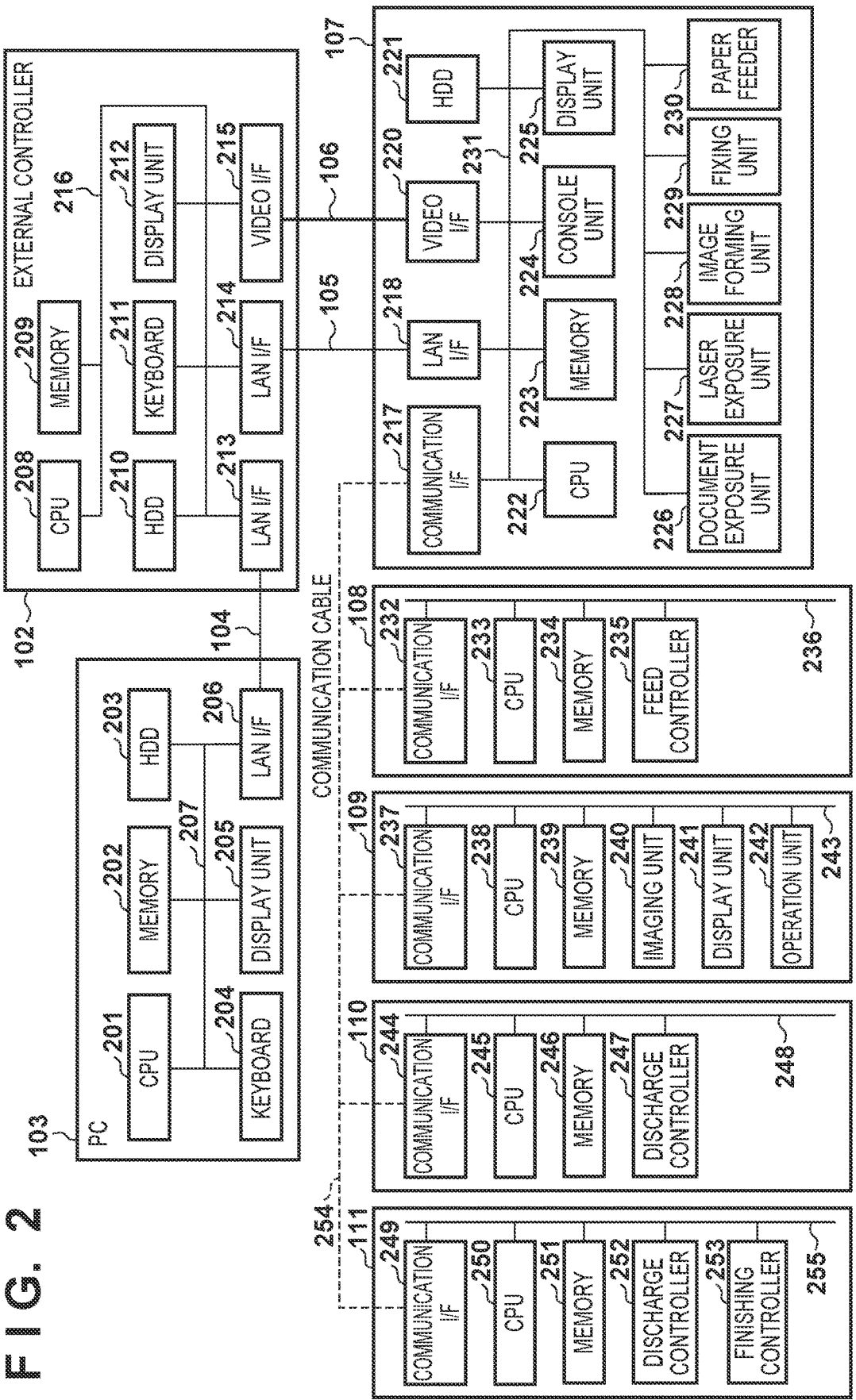
FIG. 2 is a block diagram for describing the hardware configurations of an image forming apparatus, an external controller, and a PC according to the embodiment.

FIG. 2 is a block diagram for describing the hardware configurations of the image forming apparatus 101, the external controller 102, and the PC 103 according to the first embodiment.

The configuration of the printing apparatus 107 of the image forming apparatus 101 will be described first.

The printing apparatus 107 of the image forming apparatus 101 includes a communication I/F 217, a LAN I/F 218, a video I/F 220, an HDD 221, a CPU 222, memory 223, a console unit 224, and a display unit 225. The printing apparatus 107 further includes a document exposure unit 226, a laser exposure unit 227, an image forming unit 228, a fixing unit 229, and a paper feeder 230. These constituent elements are connected via a system bus 231.

The communication I/F 217 is connected to the inserter 108, the verification apparatus 109, the large-capacity stacker 110, and the finisher 111 via communication cables 254, and performs communication for controlling those devices. The LAN I/F 218 is connected to the external controller 102 via the internal LAN 105, and communicates print data, and the like, with the external controller 102. The video I/F 220 is connected to the external controller 102 via the video cable 106, and communicates image data and the like with the external controller 102.

The HDD (hard disk drive) 221 is a storage device that saves programs, data, and the like. The CPU 222 executes a boot program stored in the memory 223, deploys, in the memory 223, a program saved in the HDD 221, executes the deployed program, and performs image processing control, comprehensive control of printing, and the like. The memory 223 includes ROM that stores the boot program, and the like, RAM used for deploying programs, and the like, is used to store programs, image data, and the like, required when the CPU 222 performs various types of processing, and furthermore provides a work area for storing various types of data when the CPU 222 executes control. The console unit 224 accepts the input of various types of settings, operation instructions, and the like, from the user. Setting information of the image forming apparatus 101, the processing status of print jobs, and the like, are displayed on the display unit 225. Note that the display unit 225 may be provided with touch panel functionality, and the display unit 225 may handle some of the functions of the console unit 224.

The document exposure unit 226 performs processing for reading a document when using a copy function, a scan function, and so on. The document exposure unit 226 irradiates a sheet set by the user, or a sheet which has been conveyed, with light from an exposure lamp and captures an image using a CMOS image sensor to obtain image data of the image. The laser exposure unit 227 performs primary charging, laser exposure, and so on for irradiating the photosensitive drum with a laser beam in order to transfer the toner image. The laser exposure unit 227 first performs the primary charging, which charges the surface of the photosensitive drum to a uniform negative potential. Then, using a laser driver, a semiconductor laser is driven to irradiate the photosensitive drum with an emitted laser beam while adjusting the reflection angle thereof using the polygonal mirror. The negative charge at the irradiated parts is neutralized, and an electrostatic latent image corresponding to the image data is formed in those parts, as a result. The image forming unit 228 is a device that transfers the toner image onto the sheet, includes a developing unit, a transfer unit, and a toner supply unit, and transfers, onto the sheet, the toner image held on the photosensitive drum. The developing unit causes negatively-charged toner to adhere to the electrostatic latent image on the surface of the photosensitive drum from a developing cylinder, which makes the image visible as a toner image. The transfer unit performs a primary transfer, in which a positive potential is applied to a primary transfer roller and the toner image on the surface of the photosensitive drum is transferred to a transfer belt, and a second transfer, in which a positive potential is applied to a secondary transfer roller and the toner image on the transfer belt is transferred onto the sheet. The fixing unit 229 applies heat and pressure to the toner image on the sheet to melt and to fix the toner image onto the sheet. The fixing unit 229 includes a heater, a fixing belt, a pressure belt, and the like. The paper feeder 230 is a device for conveying the sheet, and operations for feeding and conveying the sheet are controlled using rollers, sensors, and the like.

The configuration of the inserter 108 of the image forming apparatus 101 will be described next.

The inserter 108 of the image forming apparatus 101 includes a communication I/F 232, a CPU 233, memory 234, and a feed controller 235, and these constituent elements are connected via a system bus 236. The communication I/F 232 is connected to the printing apparatus 107 by the communication cables 254, and performs communication required for control with the printing apparatus 107. The CPU 233 performs various types of control required for feeding sheets in accordance with a control program stored in the memory 234. The memory 234 is a storage device in which the control program is stored. The feed controller 235 controls the feeding and conveyance of sheets conveyed from the paper feeder of the inserter 108, the printing apparatus 107, and so on while controlling rollers and sensors on the basis of instructions from the CPU 233.

The configuration of the verification apparatus 109 of the image forming apparatus 101 will be described next.

The verification apparatus 109 of the image forming apparatus 101 includes a communication I/F 237, a CPU 238, memory 239, an imaging unit 240, a display unit 241, and an operation unit 242, and these constituent elements are connected via a system bus 243. The communication I/F 237 is connected to the printing apparatus 107 by the communication cables 254, and performs communication required for control with the printing apparatus 107. The CPU 238 performs various types of control required for verification in accordance with a control program stored in the memory 239. The memory 239 is a storage device in which control programs, and the like, are stored. The imaging unit 240 captures an image of a conveyed sheet on the basis of instructions from the CPU 238. The imaging unit 240 reads not only printed materials to be inspected, but also printed materials to serve as correct image candidates when registering correct image data. A plurality of sheets onto which images to serve as correct image candidates have been printed are read, and the image data obtained by reading those sheets is superimposed and averaged, with the result being adopted as the correct image data. This makes it possible to eliminate, to the greatest extent possible, minute fluctuation components which are present in the printed sheet but are at a level below the inspection accuracy.

During verification, the CPU 238 compares image data obtained by the imaging unit 240 capturing an image of the sheet to be verified with the correct image data saved in the memory 239, and determines whether or not the image printed onto the sheet being verified is normal. The display unit 241 is used to display verification results, setting screens, and the like. The operation unit 242 is operated by the user, and accepts instructions to change the settings of the verification apparatus 109, register correct image data, and so on. Note that the display unit 241 may be provided with touch panel functionality, and the display unit 241 may handle some of the functions of the operation unit 242.

The configuration of the large-capacity stacker 110 of the image forming apparatus 101 will be described next.

The large-capacity stacker 110 of the image forming apparatus 101 includes a communication I/F 244, a CPU 245, memory 246, and a discharge controller 247, and these constituent elements are connected via a system bus 248. The communication I/F 244 is connected to the printing apparatus 107 by the communication cables 254, and performs communication required for control with the printing apparatus 107. The CPU 245 performs various types of control required for discharging sheets in accordance with a control program stored in the memory 246. The memory 239 is a storage device in which control programs, and the like, are stored. The discharge controller 247 performs control for taking a sheet that has been conveyed and then conveying that sheet to a stack tray, an escape tray, or the finisher 111 provided thereafter, on the basis of instructions from the CPU 245.

The configuration of the finisher 111 of the image forming apparatus 101 will be described next.

The finisher 111 of the image forming apparatus 101 includes a communication I/F 249, a CPU 250, memory 251, a discharge controller 252, and a finishing processor 253, and these constituent elements are connected via a system bus 255. The communication I/F 249 is connected to the printing apparatus 107 by the communication cables 254, and performs communication required for control with the printing apparatus 107. The CPU 250 performs various types of control required for finishing, discharging sheets, and the like, in accordance with a control program stored in the memory 251. The memory 251 is a storage device in which control programs, and the like, are stored. The discharge controller 252 controls the conveyance and discharging of sheets on the basis of instructions from the CPU 250. The finishing processor 253 controls finishing processing such as stapling, punching, and saddle-stitch book binding on the basis of instructions from the CPU 250.

The configuration of the external controller 102 will be described next.

The external controller 102 includes a CPU 208, memory 209, an HDD 210, a keyboard 211, a display unit 212, a LAN I/F 213, a LAN I/F 214, and a video I/F 215, and these are connected via a system bus 216. By deploying, in the memory 209, programs that are saved in the HDD 210, and executing those programs, the CPU 208 comprehensively executes processing such as receiving print data from the PC 103, RIP processing, sending print data to the image forming apparatus 101, and the like. The memory 209 stores programs, data, and the like, required when the CPU 208 performs various types of processing, and provides a work area for storing various types of data during control processing performed by the CPU 208. The HDD 210 stores programs, data, and the like, required for operations such as printing processing. The keyboard 211 is a device for inputting operation instructions for the external controller 102. Information such as applications executed by the external controller 102 is displayed in the display unit 212, in accordance with image signals expressing still images, moving images, and the like. The LAN I/F 213 is connected to the PC 103 via the external LAN 104, and receives printing instructions, and the like, from the PC 103. The LAN I/F 214 is connected to the image forming apparatus 101 via the internal LAN 105, and performs communication for making printing instructions, and the like, to the image forming apparatus 101. The video I/F 215 is connected to the image forming apparatus 101 via the video cable 106, and sends print data, and the like, to the image forming apparatus 101.

The configuration of the PC 103 will be described next.

The PC 103 includes a CPU 201, memory 202, an HDD 203, a keyboard 204, a display unit 205, and a LAN I/F 206, and these are connected via a system bus 207. By executing a boot program in the memory 202, deploying, in the memory 202, a word processing program, and the like, saved in the HDD 203, and executing the deployed program, the CPU 201 creates print data, executes printing instructions, and the like. The CPU 201 furthermore comprehensively controls the respective devices connected to the system bus 207. The memory 202 includes ROM, which stores the boot program, various types of data, and the like, and RAM, which provides an area for deploying the programs, and stores programs, various types of data, and the like, required when the CPU 201 performs various types of processing. The RAM also provides a work area for storing various types of data when the CPU 201 performs various types of processing. The HDD 203 stores programs, data, and the like, required for operations such as printing processing. The keyboard 204 provides a user interface through which the user inputs operating instructions to the PC 103. The display unit 205 displays information such as applications executed by the PC 103 along with image signals expressing still images, moving images, and the like. The display unit 205 may have touch panel functionality and provide a user interface function. The LAN I/F 206 is connected to the external LAN 104, and communicates printing instructions, and the like, with the external controller 102 via the external LAN 104.

Although the foregoing describes the external controller 102 and the image forming apparatus 101 as being connected by the internal LAN 105 and the video cable 106, any configuration that enables data required for printing to be exchanged may be employed, e.g., the external controller 102 and the image forming apparatus 101 may be connected only by a video cable. Furthermore, the memory 202, the memory 209, the memory 223, the memory 234, the memory 239, the memory 246, and the memory 251 may be any storage devices for holding data, programs, and the like. For example, the memory may be replaced with volatile RAM, non-volatile ROM, built-in HDDs, external HDDs, USB memory, and so on.

Figure 3:
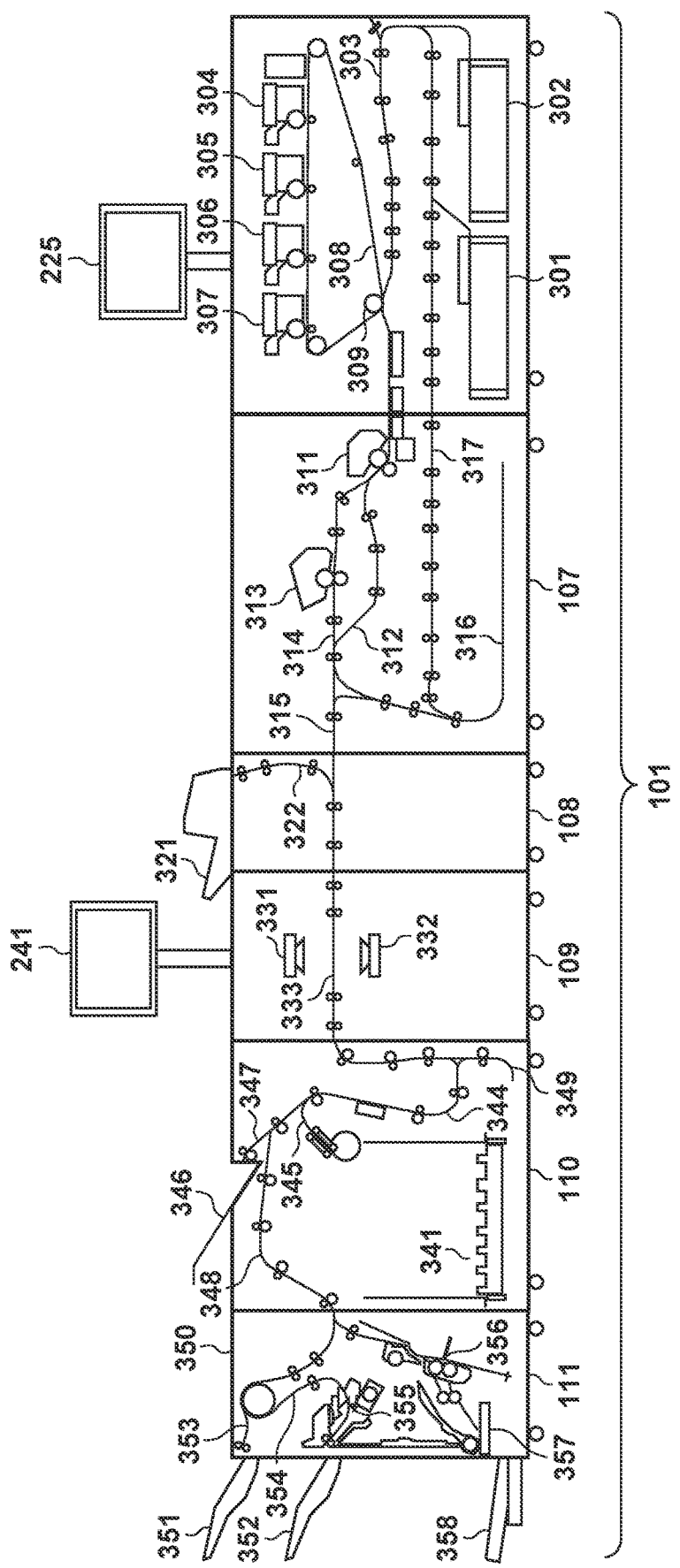
FIG. 3 depicts an overall cross-sectional view illustrating mechanisms included in the image forming apparatus according to the embodiment.

FIG. 3 depicts an overall cross-sectional view for describing mechanisms included in the image forming apparatus 101 according to the embodiment.

Paper feed decks 301 and 302 can each hold several sheets, of various types, in a stacked state. In each paper feed deck, the one sheet at the top of the stack held by the deck is separated and conveyed to a sheet conveyance path 303. Developing stations 304 to 307 form toner images using Y, M, C, and K color toners, respectively, in order to form a color image. The toner images formed here undergo a primary transfer to an intermediate transfer belt 308. The intermediate transfer belt 308 rotates in what is the clockwise direction in the drawing, and at a secondary transfer position 309, the toner image is transferred onto the sheet conveyed via the sheet conveyance path 303. The display unit 225 is used to display the printing state of the image forming apparatus 101, information for settings, and the like. A fixing unit 311 fixes the toner image onto the sheet. The fixing unit 311 includes a pressure roller and a heating roller, and fixes the toner image onto the sheet by melting and compressing the toner as the sheet passes between the rollers. The sheet that has passed through the fixing unit 311 traverses a sheet conveyance path 312 and is conveyed to a conveyance path 315. If, due to the type of the sheet, further melting and pressure are needed to fix the toner image, the sheet that has traversed the fixing unit 311 is conveyed to a second fixing unit 313 using the above sheet conveyance path, and, after additional melting and pressure have been applied, the sheet is conveyed to the conveyance path 315 through a sheet conveyance path 314. If an image forming mode is a two-sided mode, the fixed sheet is conveyed to a sheet inversion path 316, which inverts the sheet. That sheet is then conveyed to a two-sided printing conveyance path 317, and a toner image is transferred onto the second side of the sheet at the secondary transfer position 309.

The inserter 108 includes an insert tray 321, and causes a sheet that has been fed through a sheet conveyance path 322 to merge with another conveyance path. This makes it possible to insert a sheet at a desired position in a sequential group of sheets conveyed from the printing apparatus 107, and convey the sheets to the devices that follow thereafter.

The sheet that has traversed the inserter 108 is conveyed to the verification apparatus 109. Contact image sensors (CISs) 331 and 332 are disposed within the verification apparatus 109 so as to face each other. The CIS 331 is a sensor for reading a top surface of the conveyed sheet, and the CIS 332 is a sensor for reading a bottom surface of the conveyed sheet. Note that the image sensors performing this reading need not be CISs, and may by line scan cameras instead. At the timing at which the sheet conveyed in a sheet conveyance path 333 reaches a predetermined position, the verification apparatus 109 uses the CISs 331 and 332 to read an image of the sheet, and determines whether or not the printed image is normal. A result of the verification performed by the verification apparatus 109, and the like, are displayed on the display unit 241.

The large-capacity stacker 110 can stack a large volume of sheets. The large-capacity stacker 110 includes a stack tray 341 serving as a tray in which sheets are stacked. A sheet that has passed the verification apparatus 109 traverses a sheet conveyance path 344 and enters the large-capacity stacker 110. The sheet is stacked in the stack tray 341 after passing from the sheet conveyance path 344 and through a sheet conveyance path 345. The large-capacity stacker 110 further includes an escape tray 346 serving as a discharge tray. The escape tray 346 is a discharge tray for discharging a sheet that has been determined by the verification apparatus 109 to be a defective sheet. When a sheet is discharged to the escape tray 346, the sheet is conveyed from the sheet conveyance path 344 to the escape tray 346 via a sheet conveyance path 347. Note that when conveying a sheet to the finisher 111, which is in a later stage than the large-capacity stacker 110, the sheet is conveyed through a sheet conveyance path 348. A reversing unit 349 is a reversing unit for reversing the sheet. The reversing unit 349 is used when stacking sheets on the stack tray 341. When the sheet that has been input is to be stacked in the stack tray 341 with the same orientation when the sheet is output, the sheet is reversed once by the reversing unit 349. When conveying the sheet to the escape tray 346, to the finisher 111 in a later stage, and so on, the sheet is discharged as-is, i.e., without being flipped, and thus the reversing operation is not performed by the reversing unit 349.

The finisher 111 performs finishing processing on the conveyed sheet in accordance with functions designated by the user. The finisher 111 generally has finishing functions that include stapling (at one or two locations), punching (two or three holes), saddle-stitch book binding, and the like. The finisher 111 includes two discharge trays 351 and 352, and the sheet is discharged to the discharge tray 351 via a sheet conveyance path 353. However, finishing processing such as stapling cannot be performed in the sheet conveyance path 353. When performing finishing processing such as stapling, the sheet is sent to a processing unit 355 through a sheet conveyance path 354, where the finishing processing designated by the user is executed and the sheet is discharged to the discharge tray 352. The discharge trays 351 and 352 can move up and down, and the discharge tray 351 can be moved down so that the sheet subjected to the finishing processing by the processing unit 355 is then stacked in the discharge tray 351. When saddle-stitch book binding is designated, processing for adding staples to the center of the sheet is performed by a saddle-stitch processing unit 356, after which the sheet is folded in half and discharged to a saddle-stitch book binding tray 358 through a sheet conveyance path 357. The saddle-stitch book binding tray 358 is configured as a conveyor belt, such that a sheaf of saddle-stitched book-bound sheets stacked on the saddle-stitch book binding tray 358 is conveyed to the left in FIG. 3.

The verification apparatus 109 inspects an image on a sheet that has been conveyed, in accordance with pre-set inspection items. The inspection of the sheet image is performed by comparing pre-set correct image data with image data obtained by reading an image from the sheet which has been conveyed. Methods for comparing image data include a method of comparing pixel values in each of pixel locations, comparing the positions of objects by detecting edges, extracting text data through optical character recognition (OCR), and so on. Printing position skew, image color, image density, streaks, blurriness, printing dropouts, and the like, are examples of inspection items.

The flow of processing for registering correct image data and image inspection processing according to the embodiment will be described next with reference to FIG. 4A to FIG. 6.

Figure 4A:
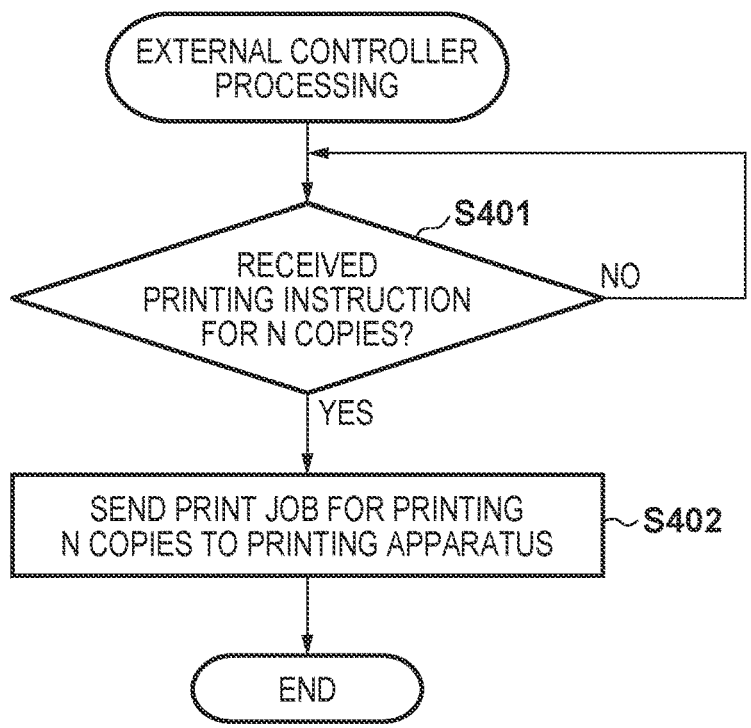
FIG. 4A is a flowchart for describing processing for registering correct image data performed by the external controller according to the embodiment.

FIG. 4A is a flowchart for describing processing for registering correct image data performed by the external controller 102 according to the embodiment. The processing described in this flowchart is implemented by the CPU 208 of the external controller 102 executing programs that have been deployed in the memory 209.

First, in step S401, the CPU 208 determines whether or not a printing instruction for N copies has been received. If the printing instruction has not been received, processing in step S401 is executed, but if it is determined that the printing instruction has been received, the processing advances to step S402. In step S402, the CPU 208 issues a print job including the printing instruction for N copies to the printing apparatus 107 and instructs the printing to be executed, after which the processing ends.

Figure 4B:
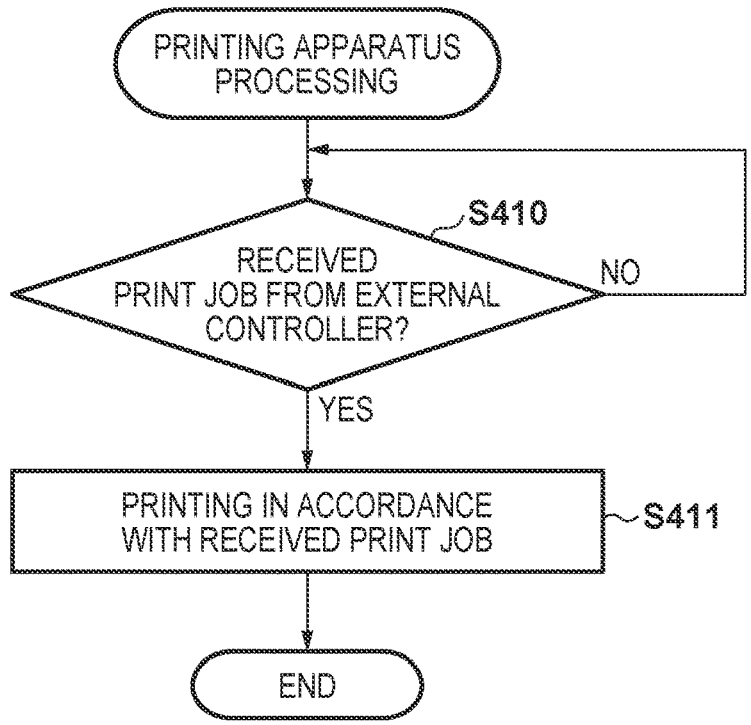
FIG. 4B is a flowchart for describing processing performed by a printing apparatus when registering correct image data, according to the embodiment.

FIG. 4B is a flowchart for describing processing performed by the printing apparatus 107 when registering the correct image data, according to the embodiment. The processing described in this flowchart is implemented by the CPU 222 of the printing apparatus 107 executing programs that have been deployed in the memory 223.

First, in step S410, the CPU 222 waits to receive a printing instruction from the external controller 102. When no printing instruction is received, processing in step S410 is executed, but if a printing instruction is received, the processing advances to step S411. In step S411, the CPU 222 executes printing in accordance with a print job received from the external controller 102. In addition to image data, the print job received from the external controller 102 at this time includes information such as a paper feed source, a discharge destination, and the like. Additionally, at this time, the CPU 222 controls the inserter 108, the verification apparatus 109, the large-capacity stacker 110, the finisher 111, and the like, in accordance with the content of the print job received from the external controller 102, via the communication cables 254. This is processing for registering the correct image data, and thus a registration instruction for the verification apparatus 109 is included as well.

Figure 5:
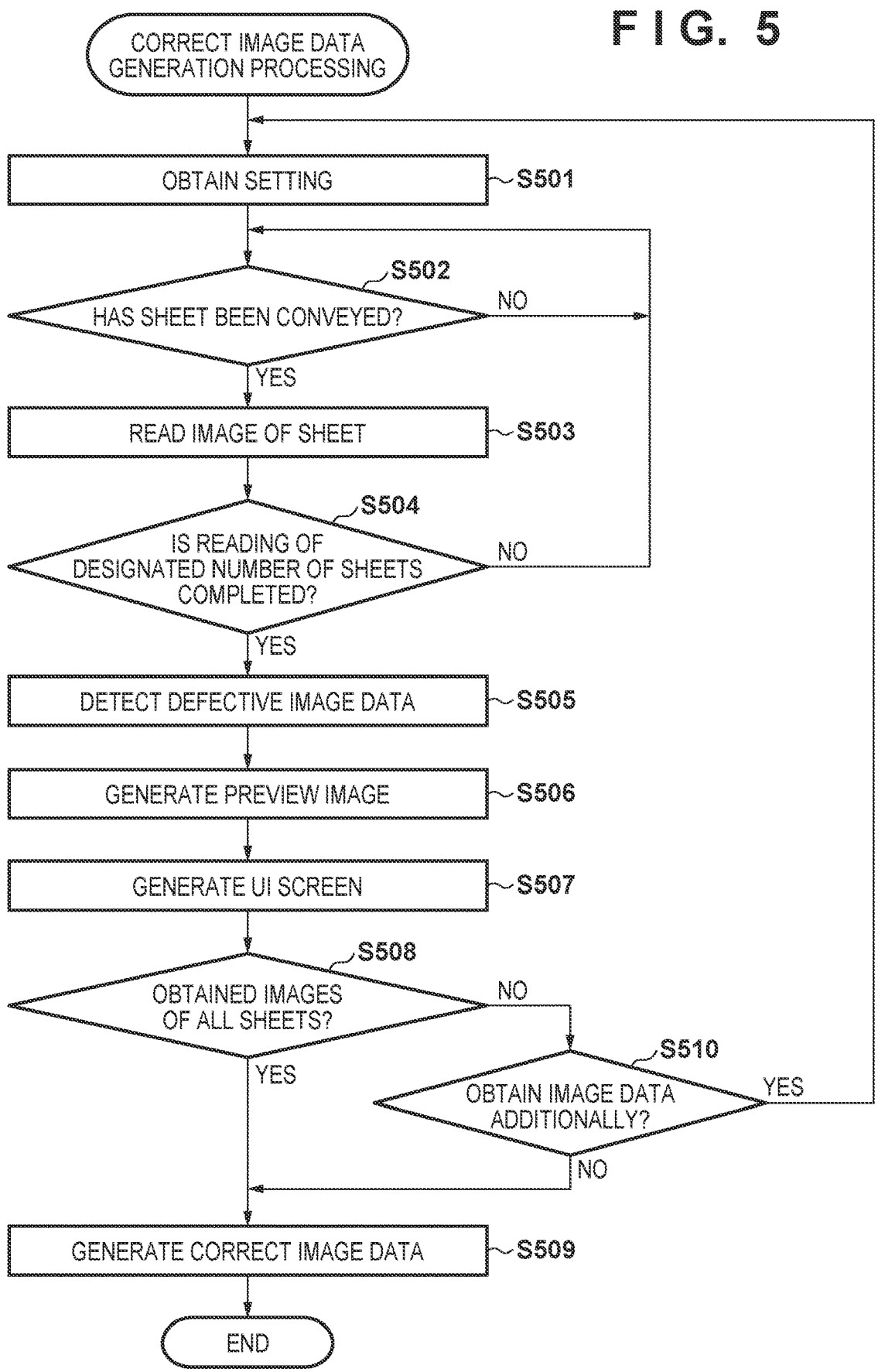
FIG. 5 is a flowchart for describing processing through which a verification apparatus generates correct image data, according to the embodiment.

FIG. 5 is a flowchart for describing processing through which the verification apparatus 109 generates correct image data, according to the embodiment. The processing described in this flowchart is implemented by the CPU 238 of the verification apparatus 109 executing programs that have been deployed in the memory 239.

First, in step S501, the CPU 238 obtains print settings. Print setting values obtained here include information such as the number of sheets per copy, a sheet surface on which a correct image is printed, and furthermore, how many sheets to use for superimposing and averaging the image data to obtain the correct image data. The processing then advances to step S502, where the CPU 238 waits for a sheet to be conveyed to the verification apparatus 109. When in step S502 a sheet is detected as having been conveyed, the processing advances to step S503, where an image of the conveyed sheet is read using the CISs 331 and 332, the image data thereof is obtained, and the image data is stored in the memory 239. An image of the sheet surface designated in step S501 is read at this time. The processing then advances to step S504, where the CPU 238 determines whether or not images of the number of sheets obtained in step S501 have been read. The processing advances to step S502 if it is determined in step S504 that images have not yet been read for the designated number of sheets.

When in step S504 the reading of images from the designated number of sheets is completed, the processing advances to step S505, where the CPU 238 starts processing for detecting whether data of an image defect is present in the image data read and saved in step S503. Here, in step S506, the CPU 238 generates preview image data for displaying, on the display unit 241 of the verification apparatus 109, a preview of the image data read and obtained in step S503. The processing then advances to step S507, where the CPU 238 displays the preview image data on the display unit 241 along with a UI screen. The UI screen displayed at this time will be described in detail later with reference to FIG. 10.

The processing then advances to step S508, where for all of the image data that has been read and obtained, the CPU 238 determines whether or not the image data has been instructed, through the operation unit 242, to be adopted as a candidate for the correct image data. Here, if all of the image data has been instructed to be adopted as candidates for the correct image data, the processing advances to step S509, where the correct image data is generated by superimposing and averaging the image data obtained and saved in step S503. The correct image data is then saved in the memory 239, and the processing ends. Note that the processing of step S509 may be performed after the processing of step S507, without performing the determination processing of step S508 and the processing of step S510.

Additionally, rather than performing the processing of steps S506 and S507 of the flowchart in FIG. 5, the correct image data may be generated using the image data, of the image data obtained in step S503, aside from the image data of defective images detected in step S505. In this case too, the processing of step S509 may be performed after the processing of step S505.

On the other hand, if in step S508 all of the image data that has been read and obtained has not been instructed to be adopted as correct image data candidates, the processing advances to step S510. In step S510, the CPU 238 determines whether or not an instruction to read an additional sheet and obtain image data has been made via the UI screen. If an instruction to obtain additional image data has been made, the processing advances to step S501, and if not, the processing advances to step S509. The determination processing of step S510 will be described later with reference to FIG. 14.

In this manner, the verification apparatus 109 reads images of the designated number of sheets as candidates for the correct image data, and when those images have been read normally, the correct image data is generated on the basis of the candidate image data. For the sheets that could not be read properly, an equivalent number of sheets may be additionally read and, once the pre-set amount of candidate image data has been obtained, the correct image data may be generated on the basis of the candidate image data.

Figure 6:
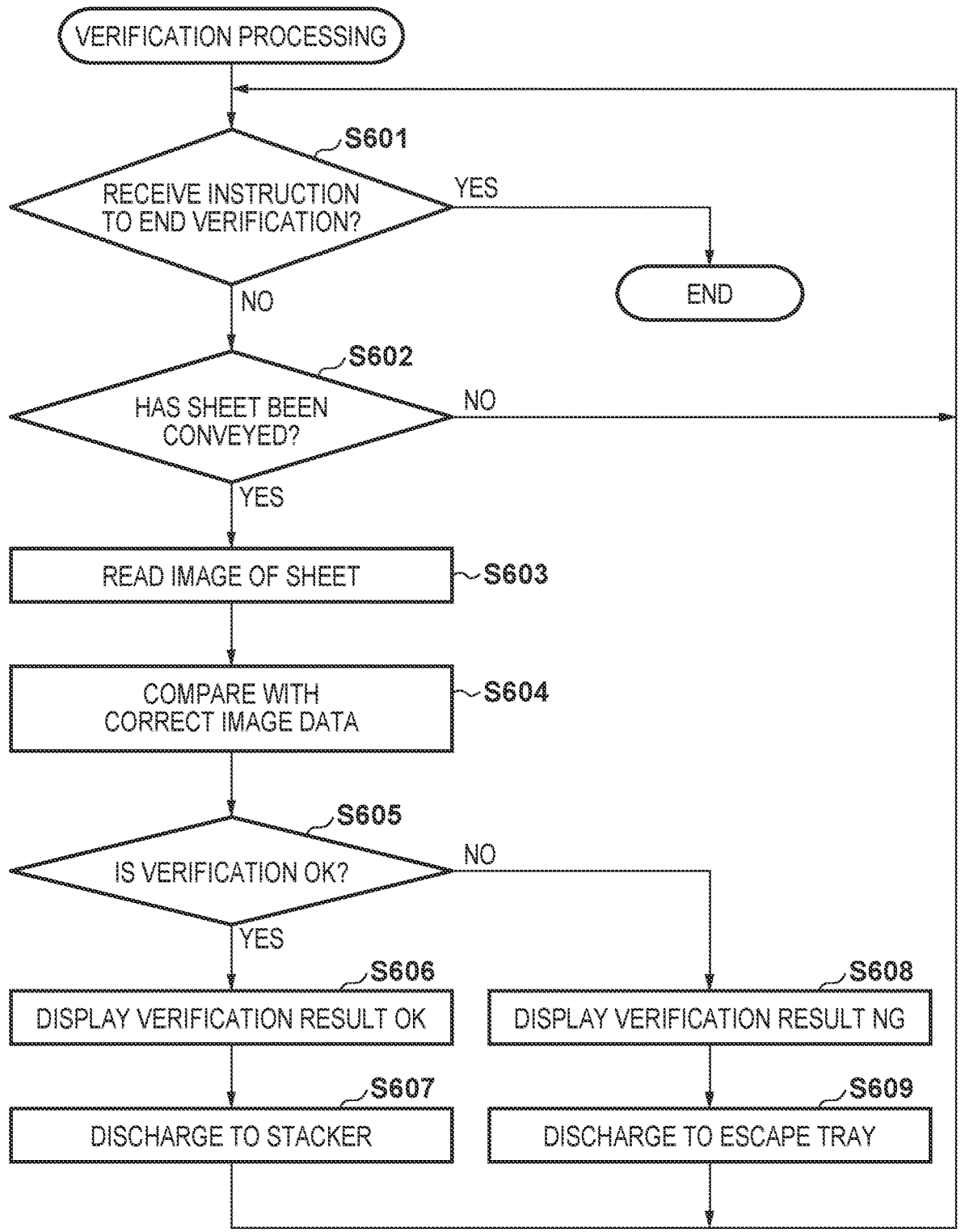
FIG. 6 is a flowchart for describing verification processing performed by the verification apparatus according to the embodiment.

FIG. 6 is a flowchart for describing verification processing performed by the verification apparatus 109 according to the embodiment. The processing illustrated in this flowchart is implemented by the CPU 238 of the verification apparatus 109 executing programs that have been deployed in the memory 239.

First, in step S601, the CPU 238 determines whether an instruction to end the verification processing has been received. If it is determined here that the instruction to end has been received, the processing ends. However, when such is not the case, the processing advances to step S602. In step S602, the CPU 238 determines whether or not a sheet has been conveyed to the verification apparatus 109 from the inserter 108 in a previous stage. If a sheet has been conveyed, the processing advances to step S601, whereas if a sheet has not been conveyed, the processing advances to step S603. In step S603, the CPU 238 reads an image of both surfaces of the sheet using the CISs 331 and 332, and the image data obtained through this reading is saved into the memory 239. Note that at this time, the CPU 238 reads an image of the side or sides of the sheet that are to be verified, i.e., the front side, the back side, or both sides. This is because even if a sheet has an image printed on the front side only, the back side of the sheet is sometimes verified to check whether or not the back surface is soiled. The processing then advances to step S604, where the CPU 238 compares the image data obtained and saved in step S603 with the correct image data created through the processing described in the flowchart of FIG. 5 and stored in the memory 239. The items compared at this time are based on a verification level set through verification level 1501 in FIG. 15, a verification type set through verification type 1502 in FIG. 15, and so on.

FIG. 15 depicts a view illustrating an example of a setting screen displayed on the display unit 241 when verification settings are made in the verification apparatus 109, according to the embodiment. This setting screen is displayed when a "verification settings" button 706, illustrated in FIG. 7 described later, is pressed.

Verification level 1501 sets a level (accuracy) at which to perform the verification. Here, the verification accuracy can be changed and set using up and down buttons. Here, setting the verification accuracy to a higher level (a level with a higher numerical value) results in the image data obtained by reading a sheet being determined to be a defective image even when there are only small differences from the correct image data. The items to be verified can be set using verification type 1502, in accordance with the purpose of the verification. In the example illustrated in FIG. 15, position, color, streaks, and dropouts are subject to verification, but density is set to be excluded from the verification. An "OK" button 1503 is a button for applying the settings in the screen. A "cancel" button 1504 is a button for discarding the settings in the screen and returning to the original screen.

Next, the processing advances to step S605, where the CPU 238 determines whether the image on the sheet is a normal image or a defective image on the basis of the result of the comparison with the correct image data. If in step S605 the CPU 238 has determined that the image is a normal image (verification success), the processing advances to step S606, where the CPU 238 displays an indication that the verification result is "OK" on the display unit 241.

FIG. 16 depicts a view illustrating an example of a screen displayed on the display unit 241 of the verification apparatus 109 in step S606.

The image of the last sheet read by the verification apparatus 109 is displayed in a preview region 1601. Determination result 1602 displays a verification result based on a comparison between the image data displayed in the preview region 1601 and the correct image data. In the example illustrated in FIG. 16, the image has been determined to be a normal image, and thus "OK" is displayed for the determination result 1602. An "end verification" button 1603 is a button that instructs the verification processing to end. When the "end verification" button 1603 is pressed, the CPU 238 ends the verification processing and returns the screen to that illustrated in FIG. 14A.

Figure 17:
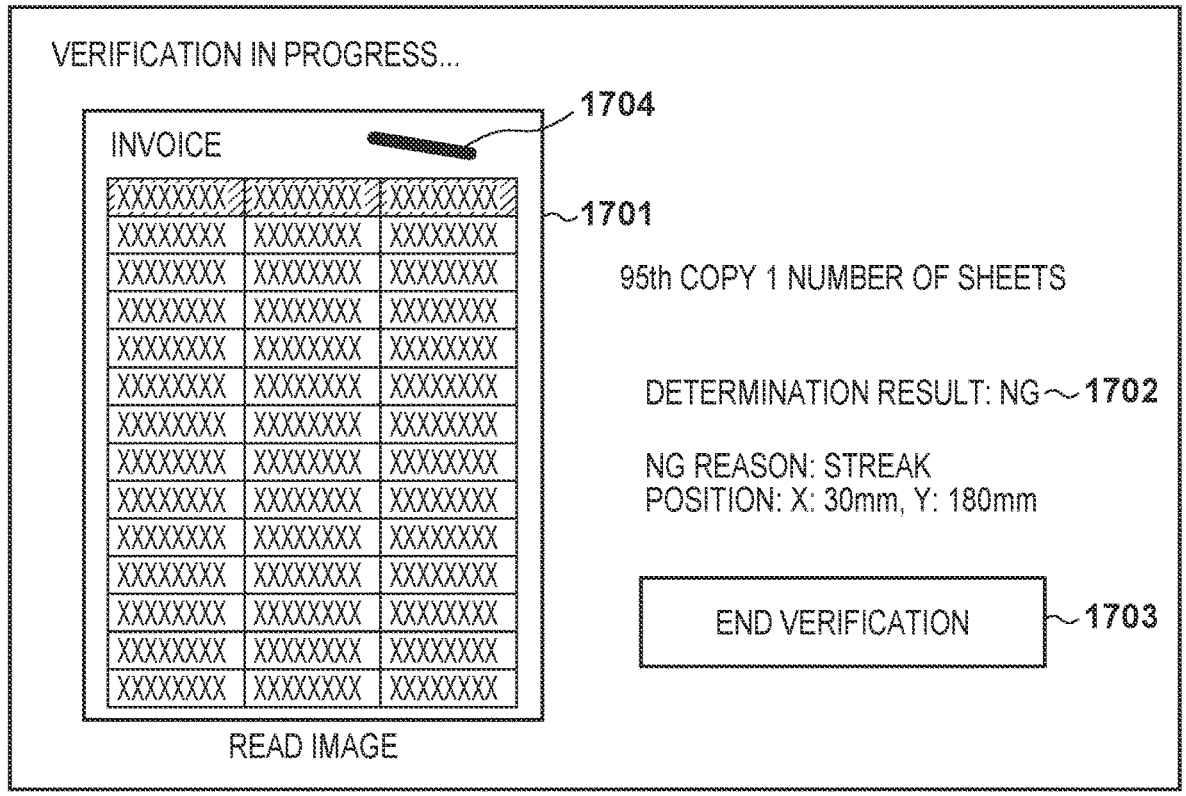
FIG. 17 depicts a view illustrating an example of a screen displayed in the display unit of the verification apparatus in step S608.

The processing then advances to step S607, where the CPU 238 instructs the printing apparatus 107 to discharge the sheet to the stack tray 341 of the large-capacity stacker 110. The processing then advances to step S601. Accordingly, upon receiving that instruction, the printing apparatus 107 controls the large-capacity stacker 110 through the communication cables 254 so that the sheet is discharged to the stack tray 341 of the large-capacity stacker 110. Note that the discharge destination used at this time is based on a discharge destination set through a setting screen illustrated in FIG. 18 (described later).

the other hand, if in step S605 the CPU 238 has determined that the image is a defective image (verification failure), the processing advances to step S608, where the CPU 238 displays an indication that the verification result is "NG" on the display unit 241. FIG. 17 depicts a view of an example of the screen displayed in step S608.

FIG. 17 depicts a view illustrating an example of a screen displayed on the display unit 241 of the verification apparatus 109 in step S608.

The image of the last sheet read by the verification apparatus 109 is displayed in a preview region 1701. Determination result 1702 displays a verification result based on a comparison between the image data displayed in the preview region 1701 and the correct image data. Here, the image has been determined to be a defective image as a result of comparing the read image data with the correct image data, and thus "NG" is displayed in the determination result 1702, along with the reason for the determination, the position of the defect, and the like. In the example of FIG. 17, a streak 1704 has been detected, as indicated in the preview region 1701, and an indication that the image has been determined to be a defective image is therefore displayed. An "end verification" button 1703 is a button that instructs the verification processing to end. When the "end verification" button 1703 is pressed, the CPU 238 ends the verification processing and returns the screen to that illustrated in FIG. 14A.

The processing then advances to step S609, where the CPU 238 instructs the printing apparatus 107 to discharge the sheet to the escape tray 346 of the large-capacity stacker 110. The processing then advances to step S601. The discharge destination used at this time is based on a discharge destination for when the verification fails, set through the setting screen illustrated in FIG. 18 (described later). Through this, the printing apparatus 107 instructs the large-capacity stacker 110 to discharge the sheet having the defective image to the escape tray 346, on the basis of an instruction from the verification apparatus 109.

Display screens displayed on the display unit 241 of the verification apparatus 109 will be described next with reference to FIGS. 7 to 14 and 18.

Figure 7:
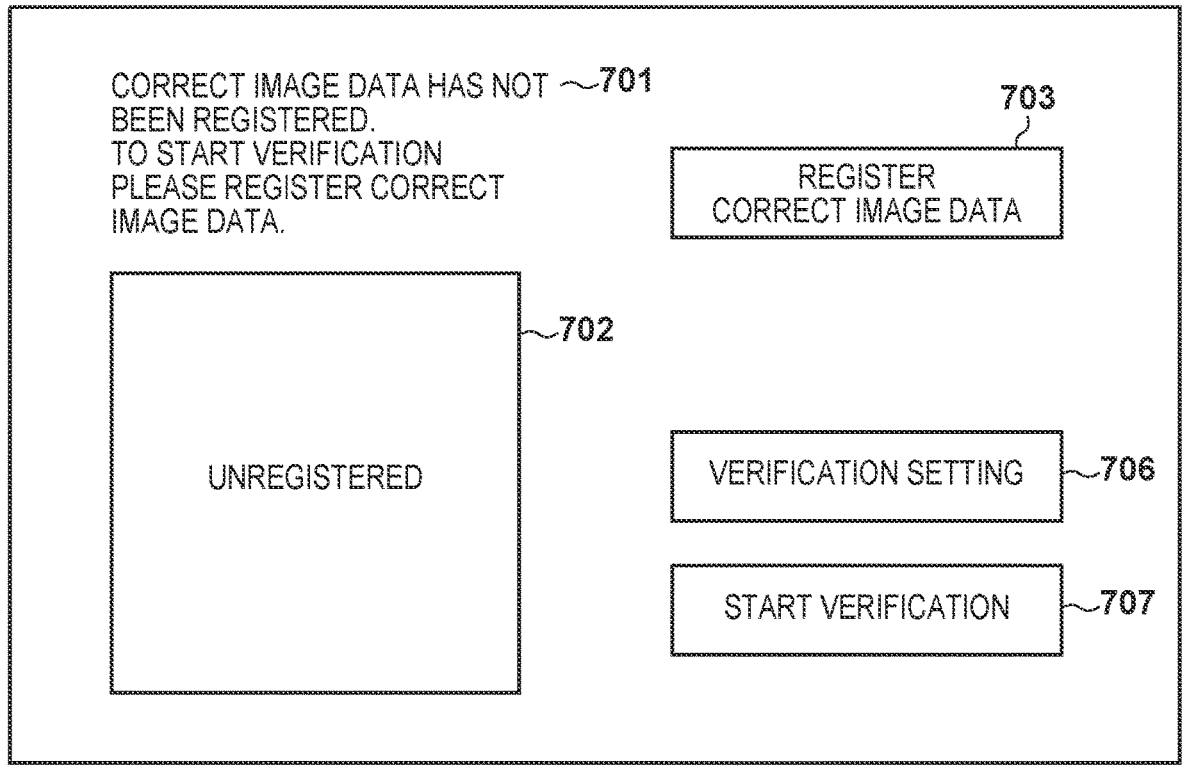
FIG. 7 is a diagram for describing an example of a screen displayed in a display unit when the verification apparatus is started up, according to the embodiment.

FIG. 7 depicts a view illustrating an example of a screen displayed on the display unit 241 when the verification apparatus 109 is started up, according to the embodiment.

Figure 8:
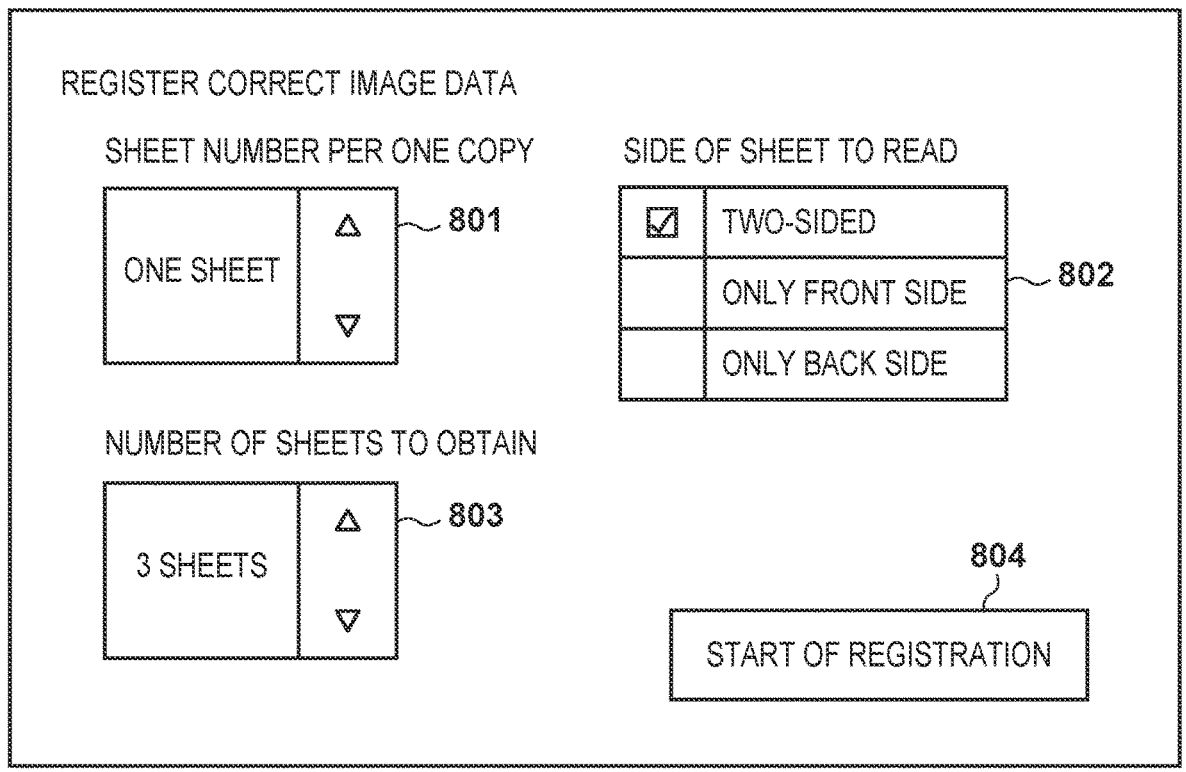
FIG. 8 depicts a view illustrating an example of a registration screen displayed in the display unit when registering correct image data, in the verification apparatus, according to the embodiment.

A message 701 indicates that there is no correct image data registered and it is therefore necessary to register correct image data in order to start the verification. If the correct image data is already registered, a message 701 indicating that the correct image data is registered is displayed, as indicated in FIG. 14A, for example. When correct image data is already registered, that registered correct image data is displayed in a display region 702 as shown in FIG. 14A. In the example of FIG. 7, no correct image data is yet registered, and thus "unregistered" is displayed. A button 703 is a button for calling a correct image data registration screen as shown in FIG. 8. The "verification setting" button 706 is a button for calling the verification setting screen as shown in FIG. 15. As described above, through the verification setting screen, the user sets verification items, the verification accuracy (the extent of differences from the correct image data at which an image is determined to be a defective image), and the like, in accordance with the purpose of the verification. A "start verification" button 707 is a button for instructing the verification to start. When the "start verification" button 707 is pressed and the verification processing starts, the CPU 238 starts inspecting the image on the sheet that has been conveyed. However, in the example of FIG. 7, no correct image data is registered, and thus the "start verification" button 707 is inactive.

FIG. 8 depicts a view illustrating an example of the registration screen displayed in the display unit 241 when registering correct image data, in the verification apparatus 109 according to the embodiment. The registration screen illustrated in FIG. 8 is displayed when the button 703, illustrated in FIG. 7, is pressed.

Sheet number 801 sets the number of sheets for each copy of a print job in which the correct image data is to be registered. When the print job has two or more sheets for each copy, the images of a plurality of sheets can be registered in the verification apparatus 109 as the correct image data. Side settings 802 sets the sides of the sheets to be read when registering the correct image data. Number of sheets to obtain 803 sets the number of pieces of image data to be obtained, superimposed, and averaged in order to generate the correct image data. A "start registration" button 804 instructs the registration of the correct image data. After the "start registration" button 804 is pressed, the CPU 238 of the verification apparatus 109 reads and obtains an image of the sheet that has been conveyed, performs processing that described before, and then starts the processing for registering the correct image data described in the flowchart of FIG. 5 and described earlier.

Figure 9:
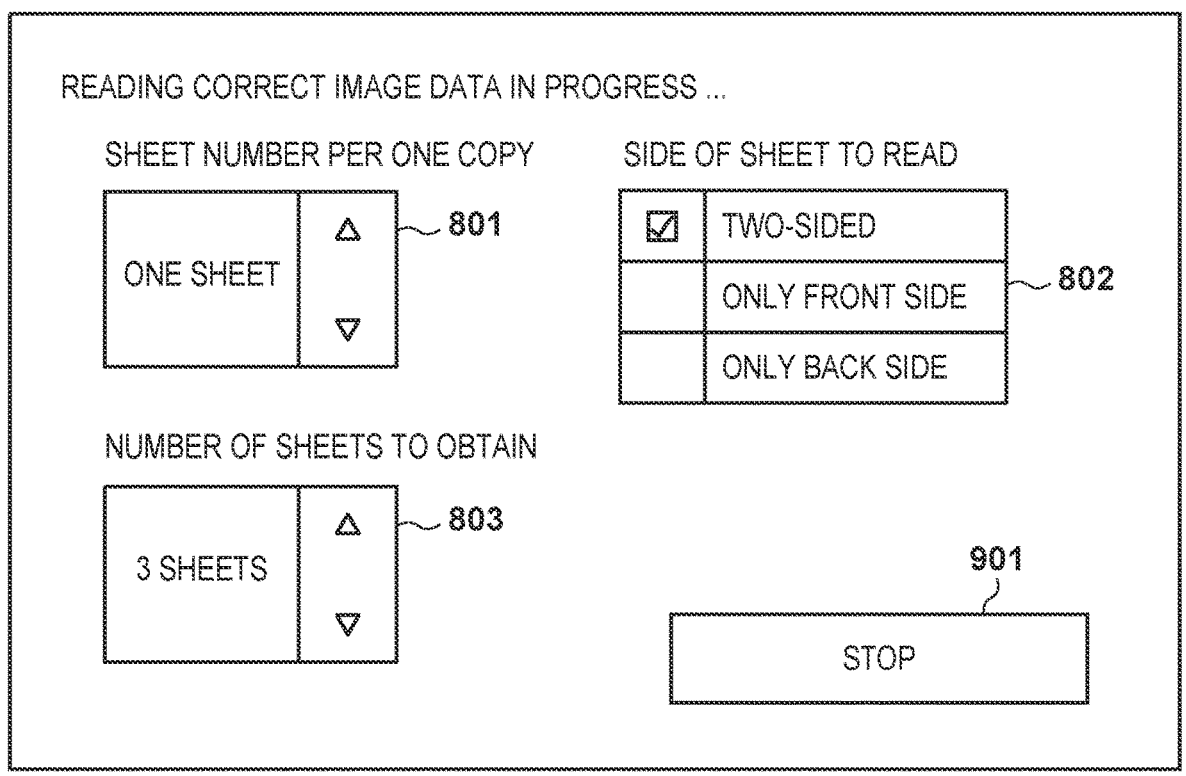
FIG. 9 depicts a view illustrating an example of a screen displayed in the display unit while the verification apparatus is reading a candidate image for correct image data, according to the embodiment.

FIG. 9 depicts a view illustrating an example of a screen displayed on the display unit 241 while the verification apparatus 109 is reading a candidate image for correct image data, according to the embodiment. The screen is displayed upon the "start registration" button 804 for the correct image data, illustrated in FIG. 8, being pressed. This screen is displayed until the number of sheets set in the sheet number 801 and the number of sheets to obtain 803 have been successfully read.

A "stop" button 901 instructs the reading of sheets for registering the correct image data to be stopped. When the "stop" button 901 is pressed, the screen returns to that illustrated in FIG. 7 without correct image data being registered.

Figure 10:
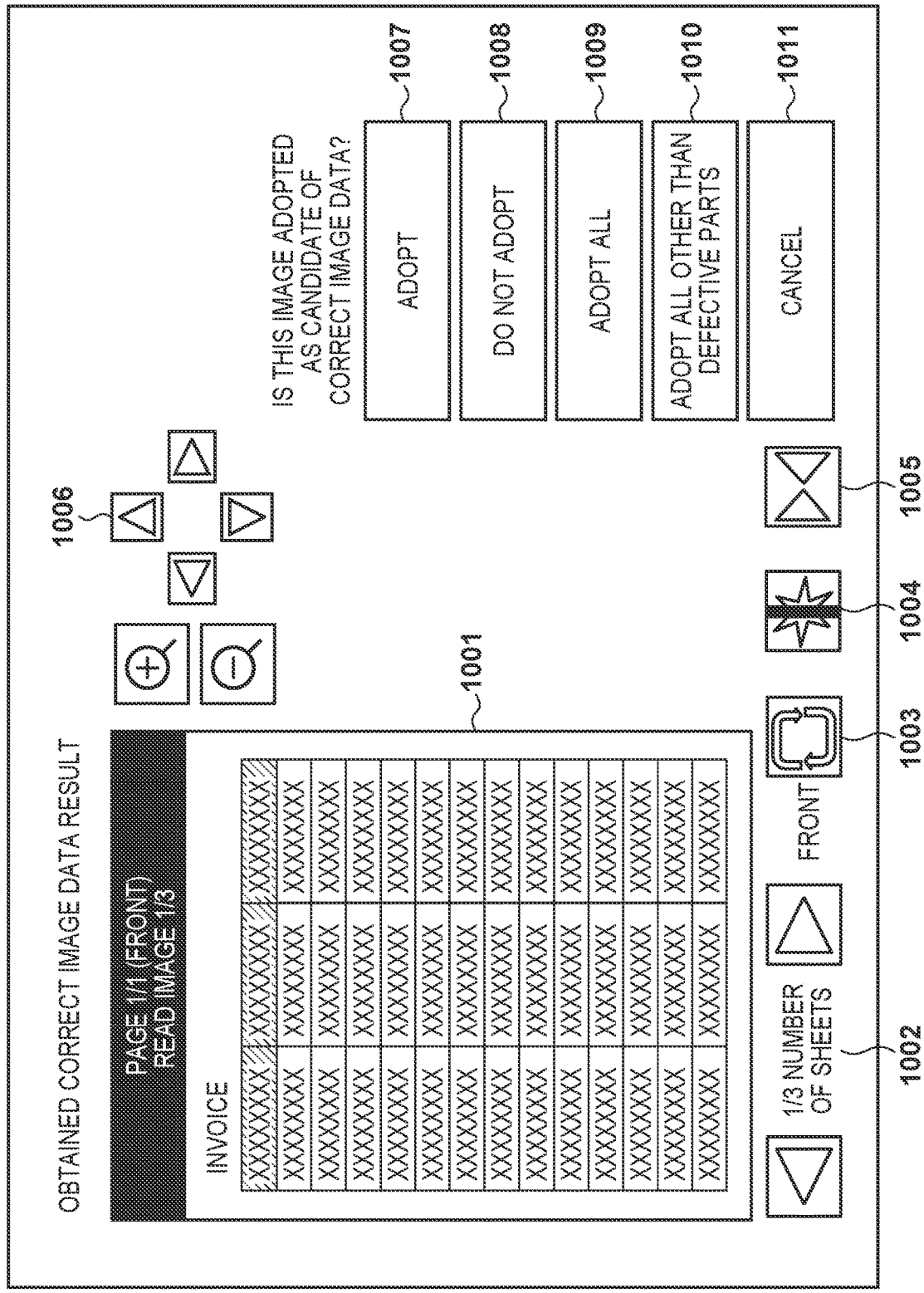
FIG. 10 depicts a view illustrating an example of a screen displayed in the display unit after the verification apparatus has finished reading a sheet in order to register correct image data, according to the embodiment.

FIG. 10 depicts a view illustrating an example of a screen displayed in the display unit 241 after the verification apparatus 109 has finished reading a sheet in order to register correct image data, according to the embodiment. This is an example of a screen for presenting read image data obtained by reading a sheet on which an image to serve as a candidate for the correct image has been printed, and allowing the user to select whether or not to adopt the read image data as candidate image data for generating the correct image data.

A preview image of the sheet read by the verification apparatus 109 is displayed in a display region 1001, and once a plurality of sheets have been read, the image being displayed can be switched using a switching button 1002. Additionally, when the images of both sides, i.e., the front and back sides of the sheet are to be displayed, the front and back images of the sheet can be switched using a switching button 1003. Additionally, when a streak-shaped image defect is present in an image that has been read, an emphasis button 1004 can be used to instruct that part to be displayed with emphasis. Furthermore, a plurality of read images can be displayed side-by-side and compared by using a button 1005.

Figure 11A:
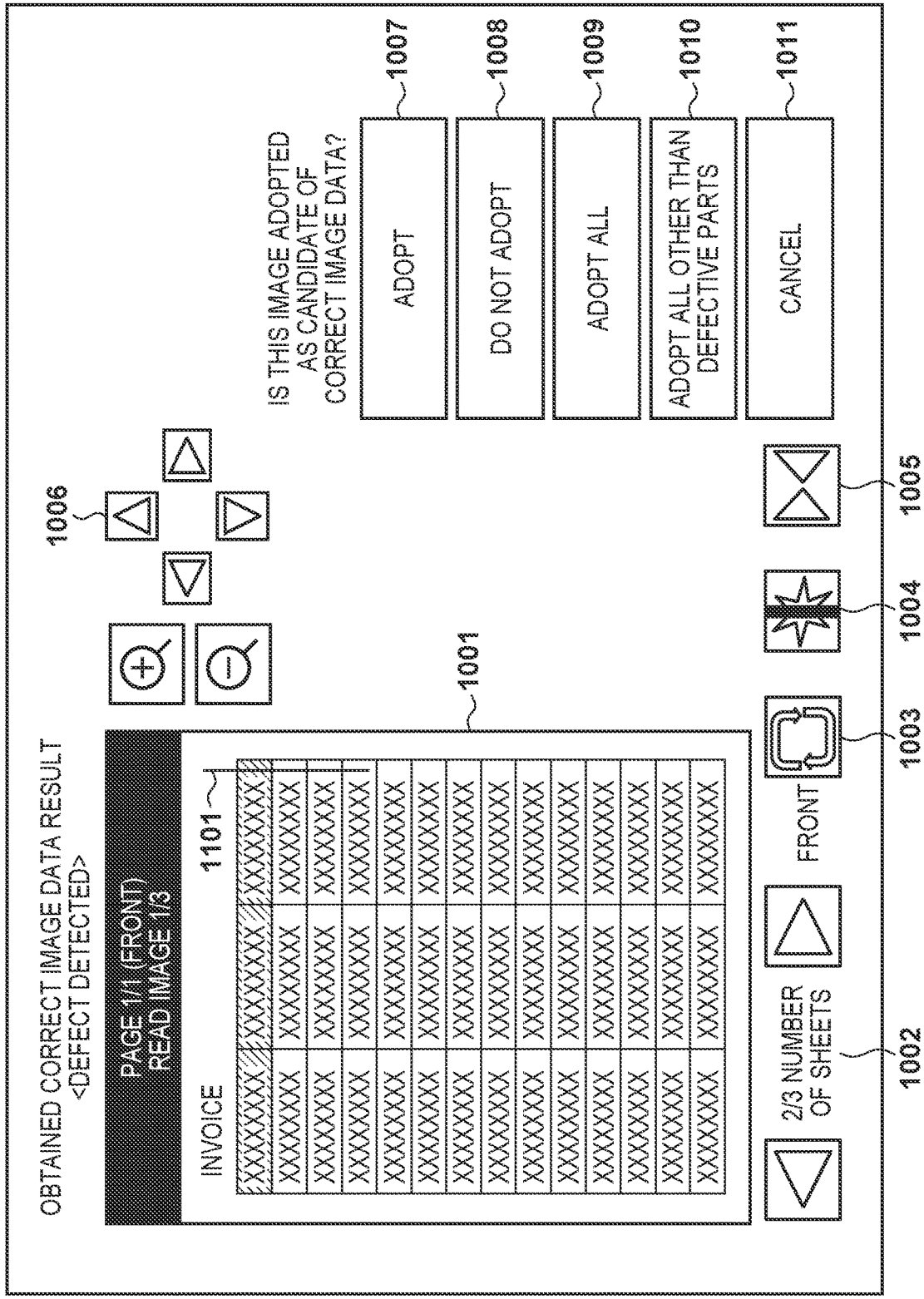
FIGS. 11A and 11B depict views illustrating a situation where, when a streak-shaped image defect is present in a read image, an emphasis button is used to display the streaky part with emphasis.
Figure 11B:
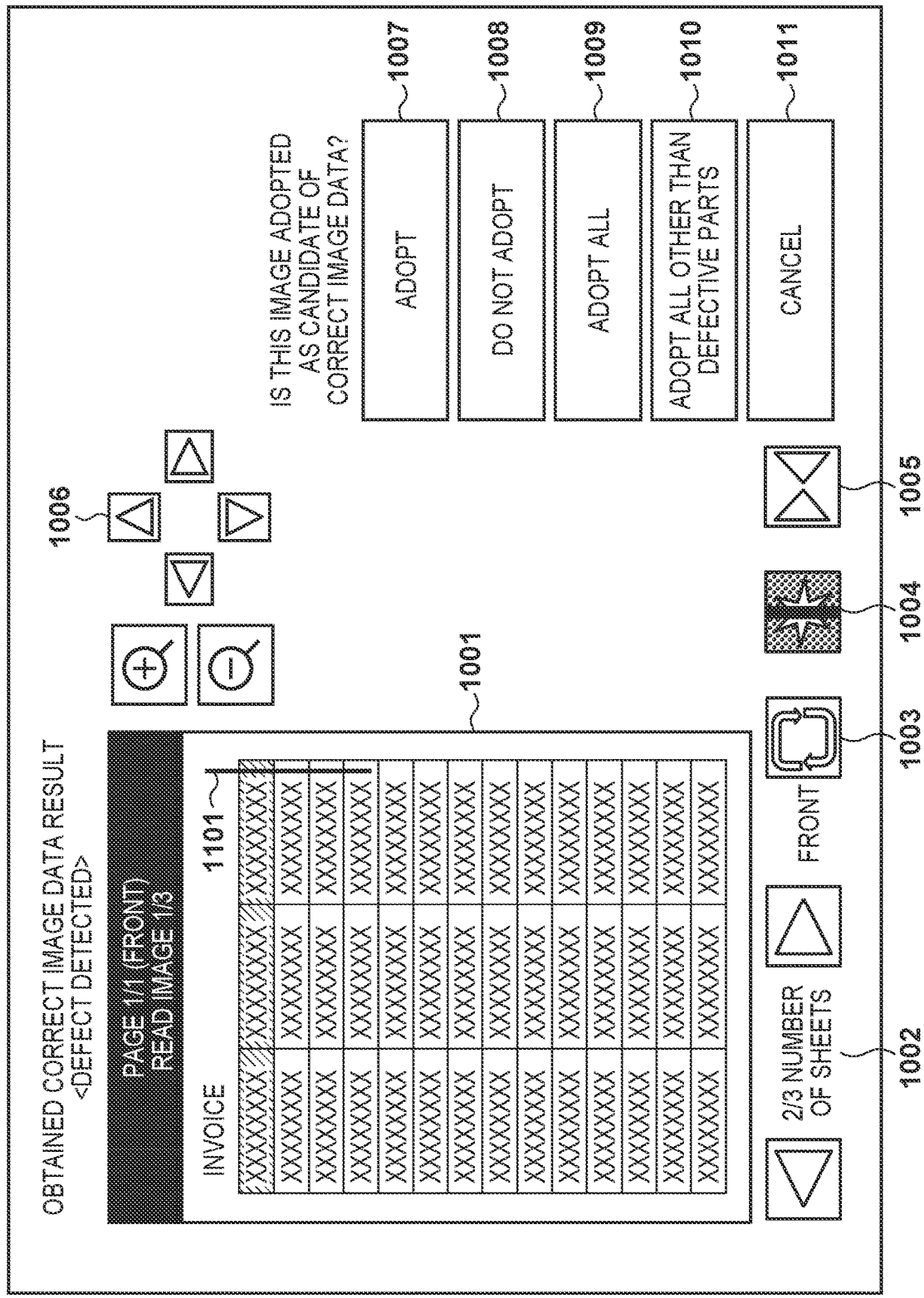

FIGS. 11A and 11B depict views illustrating a situation where, when a streak-shaped image defect is present in a read image, the emphasis button 1004 is used to display the streaky part with emphasis.

FIG. 11A depicts a view illustrating an example in which a streak 1101 is present in the read image and image defect has therefore occurred. In this case, the defective part of the image is extremely small, and it may therefore be difficult to recognize that part on the screen. However, by pressing the emphasis button 1004 on the screen in FIG. 11A, the part containing the streak 1101 can be displayed with emphasis, as illustrated in FIG. 11B. This makes it easier to determine whether the image can be adopted for the correct image data. As a method for displaying the part with emphasis, the defective image part may be displayed in a bold manner as in this example, or the part may be made visually recognizable by displaying the part with a noticeable color, in a flashing manner, or the like.

Figure 12:
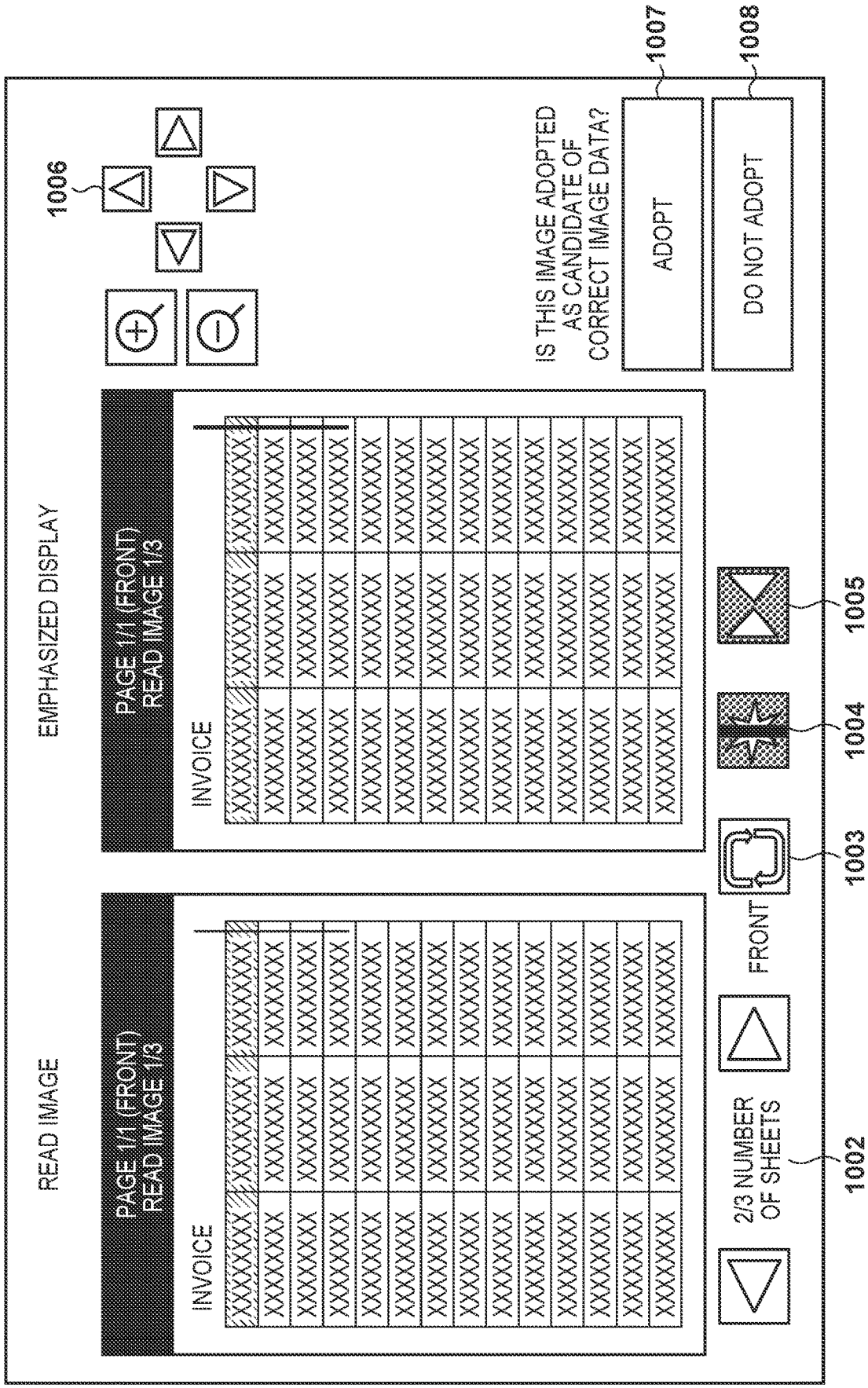
FIG. 12 depicts a view illustrating an example in which a read image and an emphasized image are displayed side-by-side, so that the images can be compared, in response to a button 1005 being pressed.

FIG. 12 depicts a view illustrating an example in which a read image and an emphasized image are displayed side-by-side, so that the images can be compared, in response to the button 1005 being pressed again.

Figure 13:
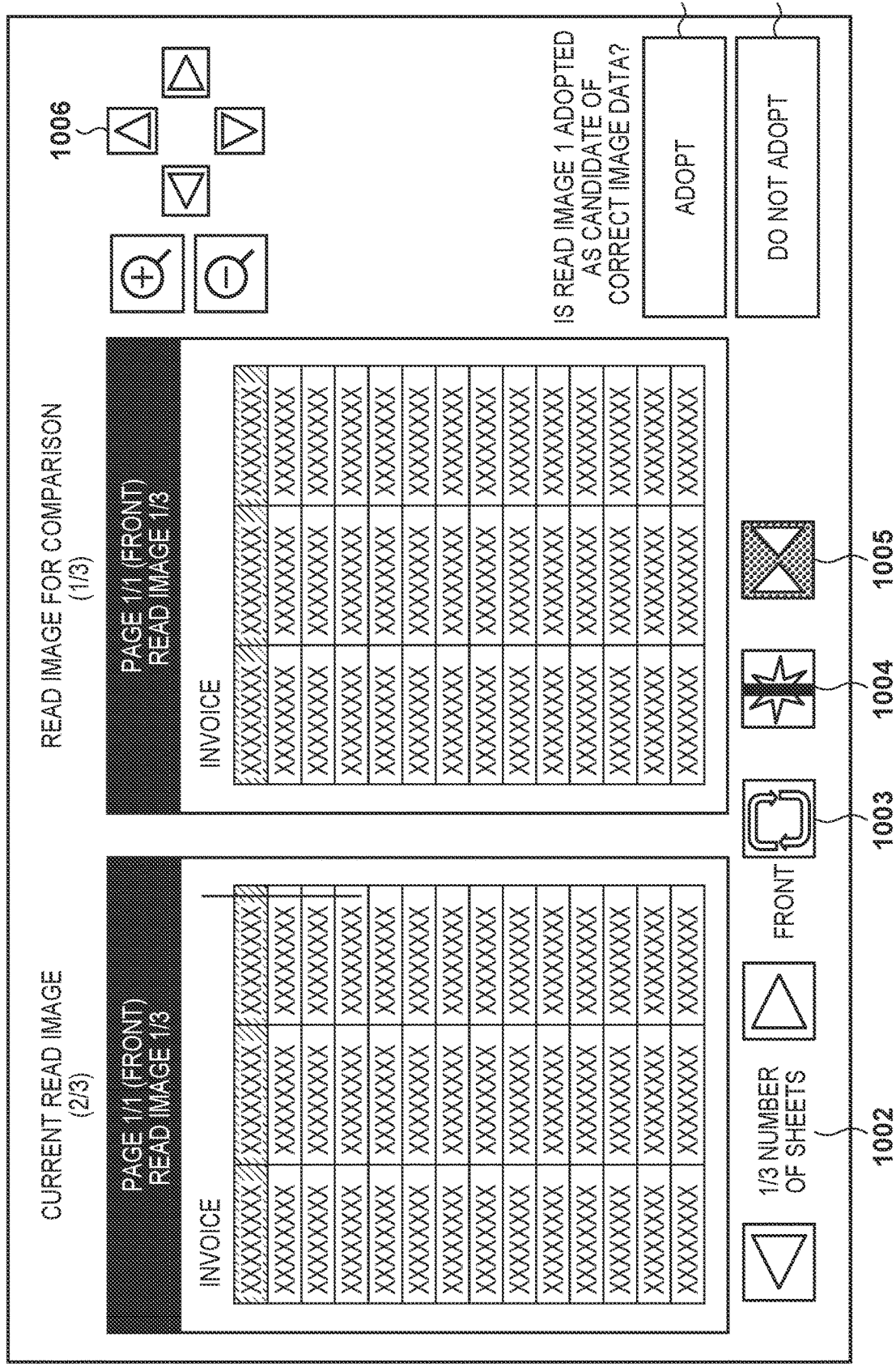
FIG. 13 depicts a view illustrating an example in which a current read image and another normal read image are displayed side-by-side, so that the images can be compared, in response to a button 1005 being pressed.

FIG. 13 depicts a view illustrating an example in which a current read image and another normal read image are displayed side-by-side, so that the images can be compared, in response to the button 1005 being pressed.

As illustrated in FIG. 13, a normal image that has been successfully read may be displayed for comparison, that enables the user to consider the images while comparing whether the defective image part was an erroneous detection for the original image or an image defect has actually occurred. Using these displays makes it possible to select read images as candidates for the correct image data more accurately than in the past.

Additionally, as illustrated in FIGS. 11A and 11B, an image enlarge/shrink button 1006 can be used to confirm the image as a whole, or enlarge/shrink specific parts of the image. Note that these operation buttons are merely examples, and gestures such as flicking, pinching, and swiping may be assigned to those operations instead of displaying the operation buttons. An "adopt" button 1007 is a button for instructing the currently-displayed image data to be adopted as a candidate image for the correct image data, after the image data displayed in the display region 1001 has been confirmed. Here, of the image data that has been read and obtained, the image data for which the "adopt" button 1007 is pressed is superimposed and averaged in order to generate the correct image data. On the other hand, a "do not adopt" button 1008 is a button for instructing the image data currently displayed in the display region 1001 not to be adopted as a candidate image for the correct image data. For each of the read images, image data for which the "do not adopt" button 1008 has been pressed is discarded, and the image data is not adopted as a candidate image for the correct image data. An "adopt all" button 1009 instructs all of the obtained image data to be adopted as candidates for the correct image data at once. When the "adopt all" button 1009 is pressed, all of the obtained image data is adopted as candidates for the correct image data.

A button 1010 is a button that instructs all pieces of image data to be adopted as candidates for the correct image data at once, with the exception of the defective image part which has been detected. Using this button 1010, the user can eliminate the burden of examining all the defective parts of the images, which makes it possible to conserve energy. If image defects have arisen in different parts of the obtained image data, it is highly likely that the image defects that occurred have been detected during the reading, and thus processing for handling image data that excludes the defective parts as candidates for the correct image data may be performed. A "cancel" button 1011 is a button that instructs all of the read image data to be discarded without being adopted as candidates for the correct image data. When the "adopt all" button 1009, the button 1010 for adopting all aside from the defective parts, or the "cancel" button 1011 is pressed, or the "adopt" button 1007 or the "do not adopt" button 1008 is pressed for all of the obtained image data, the screen transitions to the screen illustrated in FIG. 14A.

FIG. 14A depicts a view illustrating an example of a screen displayed on the display unit 241 when correct image data is registered in the verification apparatus 109, according to the embodiment.

FIG. 14A illustrates an example of a screen displayed after the correct image data is obtained. Compared to the display screen from before the correct image data is registered, illustrated in FIG. 7, an indication that the correct image data is registered is displayed in the message 701. The registered correct image data is also displayed in the display region 702. Note that the correct image data displayed here has been generated by superimposing and averaging a plurality of sheet images obtained by being read by the CISs 331 and 332.

A "clear correct image" button 1401 is a button for deleting the registered correct image data. The screen display returns to that illustrated in FIG. 7 once the correct image data has been cleared. A "register additional correct image" button 1402 is a button instructing additional correct image data to be registered. This button 1402 can be used, for example, when some of the obtained image data has been discarded in response to the "do not adopt" button 1008 being pressed in the screen illustrated in FIG. 10, but the user wishes to obtain additional correct image data candidates. The screen transitions to that illustrated in FIG. 14B when the button 1402 is pressed.

FIG. 14B depicts a view illustrating an example of a screen when additionally registering correct image data.

Number of sheets to be added 1410 is used to instruct the number of sheets to be additionally obtained. An "add individual sheet" button 1411 instructs each sheet designated in the number of sheets to be added 1410 to be read and the image data thereof to be obtained. An "add all sheets" button 1412 instructs all the sheets designated in number of sheets to be added 1410 to be read and the image data thereof to be obtained at once. Number of added images 1413 specifies how many pieces of image data are to be obtained for each sheet instructed to be additionally obtained. A "start" button 1414 is a button for instructing the additional obtaining of image data to start. When the "start" button 1414 is pressed and the image data is successfully obtained for the number of sheets specified in number of sheets to be added 1410, the screen transitions to that illustrated in FIG. 10.

Figure 18:
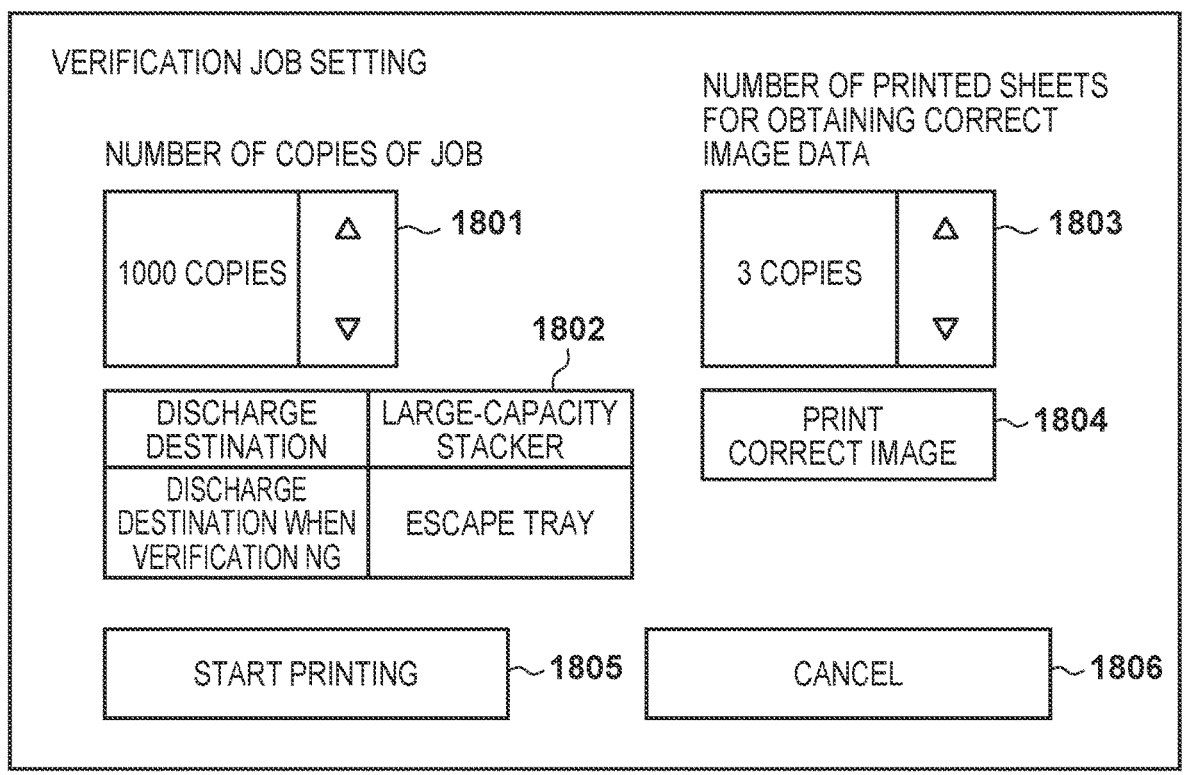
FIG. 18 depicts a view illustrating an example of a setting screen for a verification job, displayed in a display unit of the external controller, according to the embodiment.

FIG. 18 depicts a view illustrating an example of a setting screen for a verification job, displayed on the display unit 212 of the external controller 102, according to the embodiment.

The screens illustrated in FIGS. 7 to 17 and described earlier are examples of screens displayed on the display unit 241 of the verification apparatus 109 when verification settings are made in the verification apparatus 109. However, instructions for conveying printed sheets to register the correct image data in the verification apparatus 109, convey printed sheets to be verified, and so on are made from the external controller 102.

Job copy number 1801 sets the number of copies included in the print job to be verified. In the example of FIG. 18, a print job in which one thousand copies are to be printed is set as the job to be verified. Discharge destination 1802 sets the discharge destination in the job to be verified. Here, the large-capacity stacker 110 is set as the discharge destination, and the escape tray 346 is set as the discharge destination to which sheets determined to have defective images in the verification are discharged. Note that aside from these settings, the sheet discharge destination may be set to the same tray both for when verification is successful and when verification fails. In this case, the user manually removes the sheets that have failed the verification, on the basis of a verification result list (not shown). Alternatively, the configuration may be such that, when the sheet discharge destination is set to the same tray both for when verification is successful and when verification fails, the sheets that have failed the verification are discharged such that the position of the sheets is shifted, in order to make the task of removing the sheets which have failed the verification easier to be performed manually.

Number of printed sheets 1803 is a button that specifies a number of printed sheets for obtaining the correct image data. A "print correct image" button 1804 is a button that instructs a candidate image for the correct image data to be printed onto a sheet. A "start print" button 1805 instructs printing onto the sheet for the verification job to be started. When printing is instructed to start using the "start print" button 1805, the external controller 102 sends the print job to be verified to the printing apparatus 107 on the basis of the settings in the screen illustrated in FIG. 18. A cancel button 1806 cancels settings in the screen and makes transition to the screen as shown in FIG. 7 or in FIG. 14A.

After the verification apparatus 109 has been instructed to start registering the using the "start registration" button 804 illustrated in FIG. 8, and a print job including a printing instruction for the number of printed sheets 1803 and N copies has been input from the external controller 102 using the "print correct image" button 1804, the printing apparatus 107 performs processing for printing an image to serve as a candidate for the correct image data, and the verification apparatus 109 performs processing for generating the correct image data.

Note that in addition to the details described in the foregoing embodiment, when the "start registration" button 804 illustrated in FIG. 8 is pressed, a request to input a verification job, including a print job containing an instruction to print N copies, may be issued automatically from the verification apparatus 109 to the external controller 102 via the communication cables 254 and the internal LAN 105. Likewise, when the correct image is additionally obtained as indicated in FIGS. 14A and 14B, a request to add a specific page and to send a print instruction may be issued from the verification apparatus 109 to the external controller 102 when the "start" button 1414 is pressed.

Furthermore, after the verification apparatus 109 has been instructed to start the verification using the "start verification" button 707 illustrated in FIG. 7, the external controller 102 is instructed to start printing the print job to be verified, using the "start print" button 1805. In response, the external controller 102 sends the print data of the print job to the printing apparatus 107. The external controller 102 then furthermore makes an instruction for conveying, to the verification apparatus 109, the sheet onto which an image has been printed by the print job. Accordingly, when the printed sheet is conveyed, the CPU 238 of the verification apparatus 109 reads an image of the sheet and performs the verification processing.

Furthermore, in addition to the details described in the foregoing embodiment, the configuration may be such that the external controller 102 instructs the verification apparatus 109 to start the verification at the same time as when the "start print" button 1805 is pressed to instruct the start of the print job to be verified. In this case, the configuration may be such that the verification apparatus 109 notifies the external controller 102 of whether or not the correct image data is registered, with the external controller 102 not starting the print job to be verified in the event that the correct image data is not registered.

According to the embodiment described above, when registering correct image data, a preview of image data, which has been obtained by reading a sheet onto which a correct image has been printed, is displayed, and a user can then confirm the quality of the printed image. Through this, the user can determine whether or not to adopt that image data as a candidate for the correct image data not only having visually confirmed the printed sheet, but also having confirmed whether or not the correct image has been correctly read by the sensor.

Other Embodiments

Embodiments of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., an application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., a central processing unit (CPU), of a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:
1. An image processing apparatus comprising:
a printer that prints an image on a sheet;
a scanner that reads an image on a sheet; and
one or more controllers including one or more processors and one or more memories, the one or more controllers being configured:
to cause the scanner to read an image on a sheet;
to cause a display to display the image read by the scanner;
to receive an instruction for designating a reference image candidate from the image displayed on the display;
to generate the reference image based on the reference image candidate;
to register the reference image;

to cause the scanner to read an image on a sheet printed by the printer and to inspect the image printed on the sheet based on the read image and the registered reference image; and in a case that the image read by the scanner is displayed for receiving the instruction and the displayed image is a defective image that contains a defective area, to cause the display to display, side by side, (i) a defective image including the defective area that is emphasized and (ii) a defective image including the defective area that is not emphasized.

2. The image processing apparatus according to claim 1, wherein the one or more controllers further cause the display to display an option for enabling a user to select the reference image candidate.

3. The image processing apparatus according to claim 1, wherein the one or more controllers further cause the display to display an option for enabling a read image that does not contain the defective area or an image that excludes a portion having the defective area to serve as the reference image candidate.

4. The image processing apparatus according to claim 1, wherein the one or more controllers are further configured to specify, to the scanner, at least one of a number of read images obtained by reading the sheets, a number of sheets to be read, and a side of the sheet to be read.

5. The image processing apparatus according to claim 1, wherein the one or more controllers cause the display to display a plurality of read images side by side.

6. The image processing apparatus according to claim 1, wherein, in generating the reference image, the one or more controllers generate the reference image by superimposing and averaging a plurality of selected reference image candidates.

7. The image processing apparatus according to claim 1, wherein the one or more controllers are further configured, when the number of read images obtained by reading the sheets is specified and a read image including the defective area is to be excluded from the reference image candidates, to cause the scanner to read an additional sheet to obtain an image from the additional sheet.

8. An inspection apparatus comprising:
a printer that prints an image on a sheet;
a scanner that reads an image on a sheet; and
one or more controllers including one or more processors and one or more memories, the one or more controllers being configured:
to cause the scanner to read an image on a sheet;
to cause a display to display the image read by the scanner;
to receive an instruction for designating a reference image candidate from the image displayed on the display;
to generate the reference image based on the reference image candidate;
to register the reference mage;
to cause the scanner to read an image on a sheet printed by the printer and to inspect the image printed on the sheet based on the read image and the registered reference image candidate;
in a case that the read image is a defective image that contains a defective area, to cause the display to display the defective image in which the defective area is emphasized in accordance with a user's instructions; and
to cause the display to display side by side (i) the defective image in which the defective area is emphasized and (ii) the read image in which the defective area is not emphasized.

9. The inspection apparatus according to claim 8, wherein the one or more controllers further cause the display to display an option for enabling a user to select the image to serve as the reference image candidate.

10. The inspection apparatus according to claim 8, wherein the one or more controllers further cause the display to display an option for enabling a read image that does not contain the defective area or an image that excludes a portion having the defective area to serve as the reference image candidate.

11. The inspection apparatus according to claim 8, wherein the one or more controllers are further configured to specify, to the scanner, at least one of a number of read images obtained by reading the sheets, a number of sheets to be read, and a side of the sheet to be read.

12. The inspection apparatus according to claim 8, wherein the one or more controllers cause the display to display a plurality of read images side by side.

13. The inspection apparatus according to claim 8, wherein, in generating the reference image, the one or more controllers generate the reference image by superimposing and averaging a plurality of images to serve as the reference image candidate.

14. The inspection apparatus according to claim 8, wherein the one or more controllers are further configured, when the number of read images obtained by reading the sheets is specified and a read image containing the defective area is to be excluded from the reference image candidate, to cause the scanner to read an additional sheet to obtain a read image from the additional sheet.

15. A method of controlling an image processing apparatus having a printer that prints an image on a sheet and a scanner that reads an image on a sheet, the method comprising:
causing the scanner to read an image on a sheet;
causing a display to display the image read by the scanner;
receiving an instruction for designating a reference image candidate from the image displayed on the display;
generating the reference image based on the reference image candidate;
registering the reference image;
causing the scanner to read an image on a sheet printed by the printer and inspecting the image printed on the sheet based on the read image and the registered reference image; and
in a case that the image read by the scanner is displayed for receiving the instruction and the displayed image is a defective image that contains a defective area, causing the display to display, side by side, (i) a defective image including the defective area that is emphasized and (ii) a defective image including the defective area that is not emphasized.

16. A method of controlling an inspection apparatus having a printer that prints an image on a sheet and a scanner that reads an image on a sheet, the method comprising:
causing the scanner to read an image on a sheet;
causing a display to display the image read by the scanner;
receiving an instruction for designating a reference image candidate from the image displayed on the display;
generating the reference image based on the reference image candidate;
registering the reference image;

causing the scanner to read an image on a sheet printed by the printer and inspecting the image printed on the sheet based on the read image and the registered reference image;

in a case that the read image is a defective image that contains a defective area, causing the display to display the defective image in which the defective area is emphasized with a user's instruction; and causing the display to display side by side (i) the defective image in which the defective area is emphasized and (ii) the read image in which the defective area is not emphasized.

17. A non-transitory computer-readable storage medium storing a program for causing a computer to execute a method of controlling an image processing apparatus that includes a printer that prints an image on a sheet and a scanner that reads an image on a sheet, the method comprising:

causing the scanner to read an image on a sheet;

causing a display to display the image read by the scanner;

receiving an instruction for designating a reference image candidate from the image displayed on the display;

generating the reference image based on the reference image candidate;

registering the reference image;

causing the scanner to read an image on a sheet printed by the printer and inspecting the image printed on the sheet based on the read image and the registered reference image; and in a case that the image read by the scanner is displayed for receiving the instruction and the displayed image is a defective image that contains a defective area, causing the display to display, side by side, (i) a defective image including the defective area that is emphasized and (ii) a defective image including the defective area that is not emphasized.

18. The image processing apparatus according to claim 1, wherein the defective image includes a streak-shaped image defect.

19. The image processing apparatus according to claim 1, wherein the one or more controllers cause the display to display the defective image including the defective area that is emphasized in accordance with a designation of emphasis.

20. The image processing apparatus according to claim 1, wherein the defective image is displayed with the defective area in a bold manner.

21. The image processing apparatus according to claim 1, wherein the defective image is displayed with a noticeable color or in a flashing manner.

* * * * *